(12) United States Patent
Tanaka et al.

(10) Patent No.: US 7,099,260 B2
(45) Date of Patent: Aug. 29, 2006

(54) OBJECTIVE LENS FOR OPTICAL DISK

(75) Inventors: Yasuhiro Tanaka, Ashiya (JP); Michihiro Yamagata, Osaka (JP); Tomohiko Sasano, Suita (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/922,656

(22) Filed: Aug. 19, 2004

(65) Prior Publication Data

US 2005/0018586 A1    Jan. 27, 2005

Related U.S. Application Data

(62) Division of application No. 09/763,385, filed as application No. PCT/JP00/04076 on Jun. 21, 2000, now Pat. No. 6,829,209.

(30) Foreign Application Priority Data

Jun. 23, 1999 (JP) ................. 11-177177
Sep. 10, 1999 (JP) ................. 11-256686

(51) Int. Cl.
*G11B 7/00* (2006.01)

(52) U.S. Cl. ................................. 369/112.26

(58) Field of Classification Search ........... 369/112.23, 369/112.25, 112.26, 112.08, 112.13, 44.23
See application file for complete search history.

(56) References Cited

U.S. PATENT DOCUMENTS

| 5,703,862 A | 12/1997 | Lee et al. |
| 5,777,803 A | 7/1998 | Ju et al. |
| 5,808,999 A * | 9/1998 | Yagi ................. 369/112.26 |
| 5,870,369 A | 2/1999 | Chung et al. |
| 5,889,748 A | 3/1999 | Shimano et al. |
| 5,986,993 A | 11/1999 | Yoo et al. |
| 6,061,324 A | 5/2000 | Arai et al. |
| 6,104,688 A | 8/2000 | Kikuchi et al. |
| 6,124,988 A | 9/2000 | Yanagisawa et al. |
| 6,134,055 A | 10/2000 | Koike |
| 6,215,756 B1 | 4/2001 | Shimano et al. |
| 6,363,037 B1 | 3/2002 | Yamazaki |

FOREIGN PATENT DOCUMENTS

| EP | 0 721 124 | 7/1996 |
| EP | 0 818 781 | 1/1998 |
| EP | 0 874 359 | 10/1998 |

(Continued)

*Primary Examiner*—Thang V Tran
(74) *Attorney, Agent, or Firm*—Hamre, Schumann, Mueller & Larson, P.C

(57) ABSTRACT

An objective lens for an optical disk including one lens and capable of satisfying an excellent focusing property on any of two kinds of optical disks each having a different thickness. The objective lens (2) is formed of a single lens having aspheric surfaces on both sides with the surface (3) at the side of the light source a rotationally symmetric aspheric surface. Furthermore, the surface at the side of the optical disk (6) of the objective lens (2) is divided into an inner circumference region (4) and an outer circumference region (5) and a surface (7) forming the difference in level of about 0.3 µm that is provided in parallel to the optical axis (in the direction of the optical axis) at the boundary between the inner circumference region (4) and the outer circumference region (5). The spherical aberration is corrected by the inner circumference region (4) and outer circumference (5) of the objective lens (2) corresponding to the optical disks having a different thickness.

3 Claims, 28 Drawing Sheets

FOREIGN PATENT DOCUMENTS

| | | |
|---|---|---|
| JP | 60-74006 | 5/1985 |
| JP | 5-97450 | 4/1993 |
| JP | 6-147886 | 5/1994 |
| JP | 6-256025 | 9/1994 |
| JP | 8-257886 | 10/1996 |
| JP | 8-334690 | 12/1996 |
| JP | 9-145994 | 6/1997 |
| JP | 9-145995 | 6/1997 |
| JP | 9-184975 | 7/1997 |
| JP | 9-197108 | 7/1997 |
| JP | 9-230114 | 9/1997 |
| JP | 10-143905 | 5/1998 |
| JP | 10-228667 | 8/1998 |
| JP | 10-255305 | 9/1998 |
| JP | 10-289464 | 10/1998 |
| JP | 10-319316 | 12/1998 |
| JP | 11-2759 | 1/1999 |
| JP | 11-96585 | 4/1999 |
| JP | 11-183160 | 7/1999 |
| JP | 2000-28918 | 1/2000 |
| JP | 2000-56216 | 2/2000 |

* cited by examiner

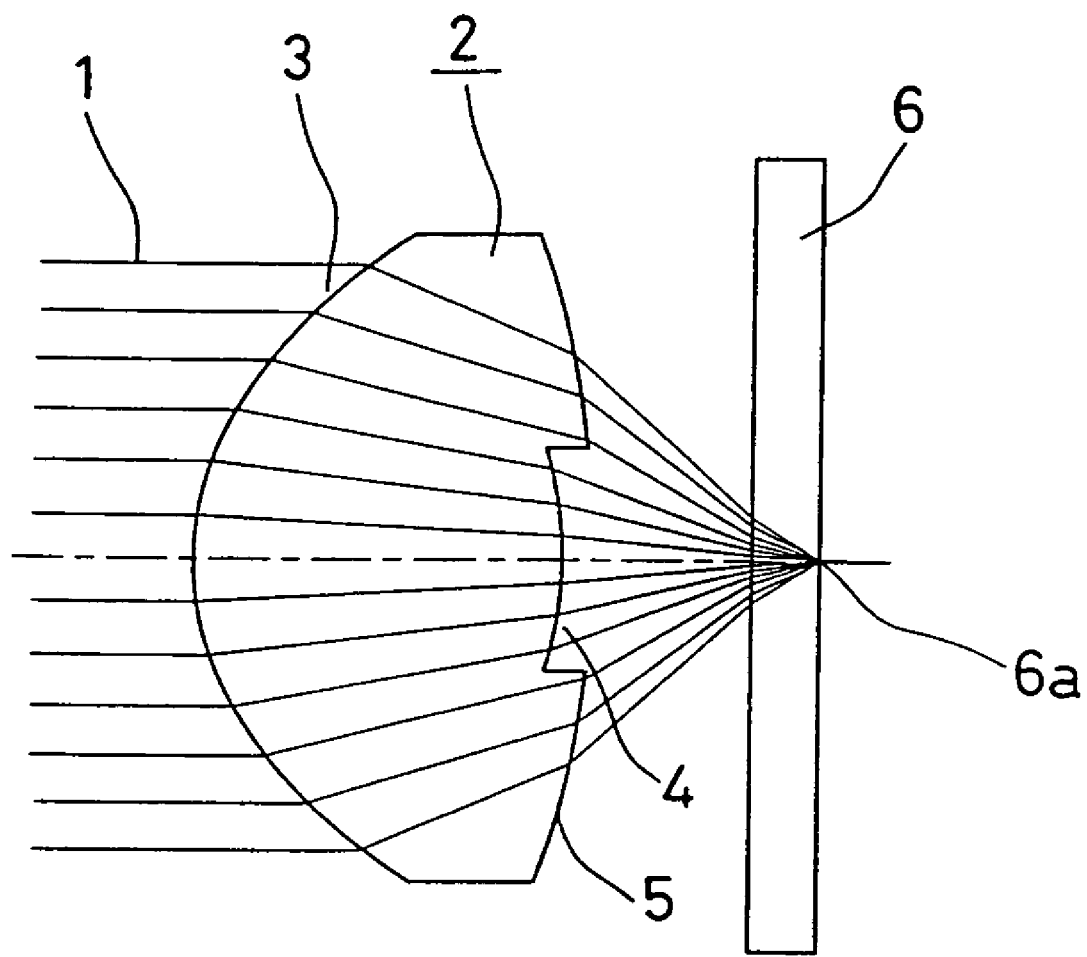
F I G. 1

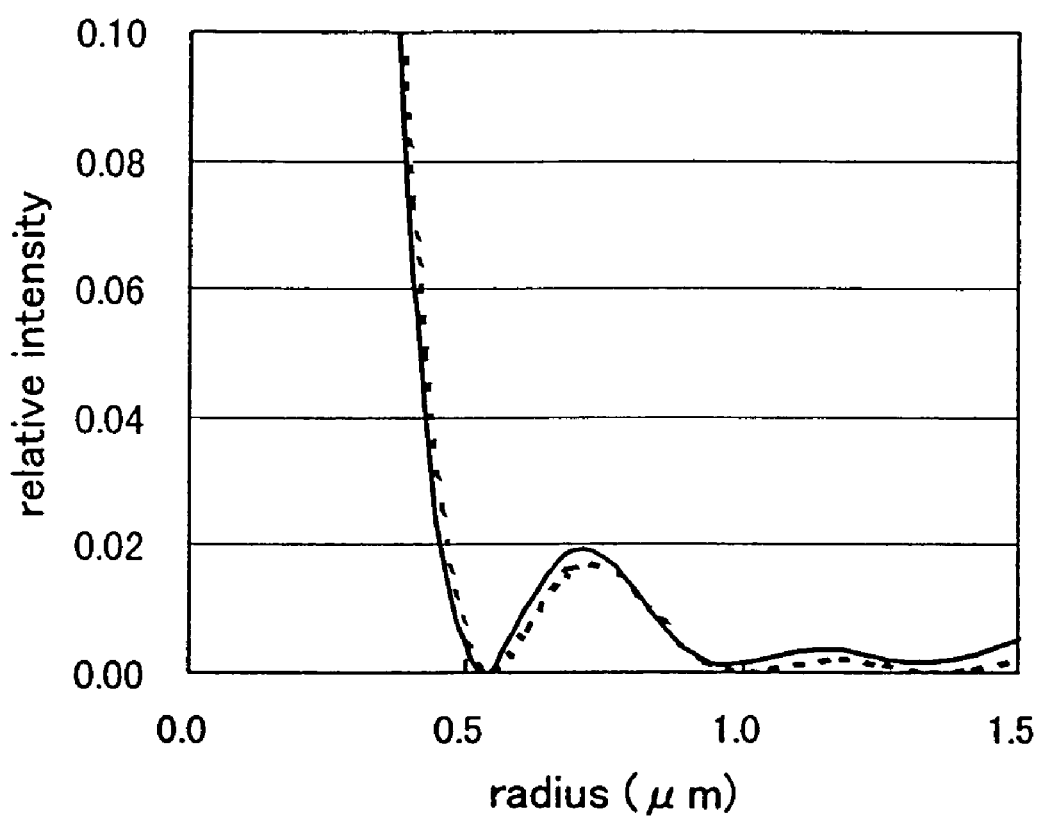
F I G. 4

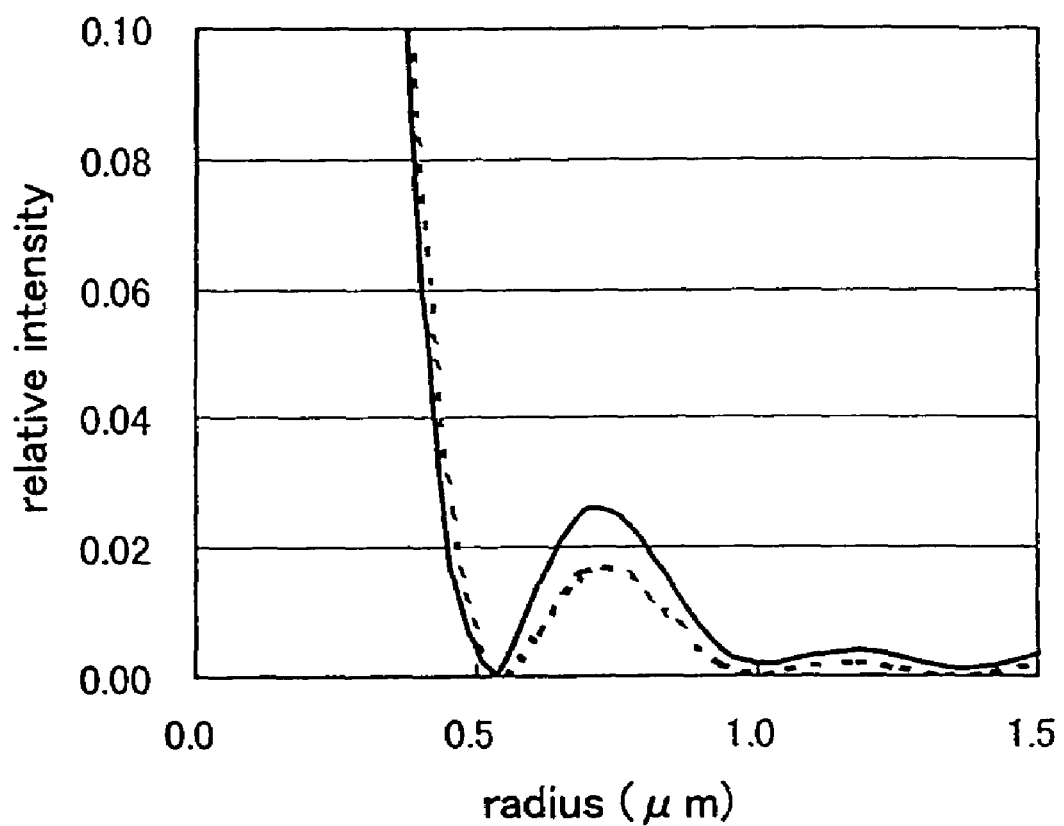
F I G. 6

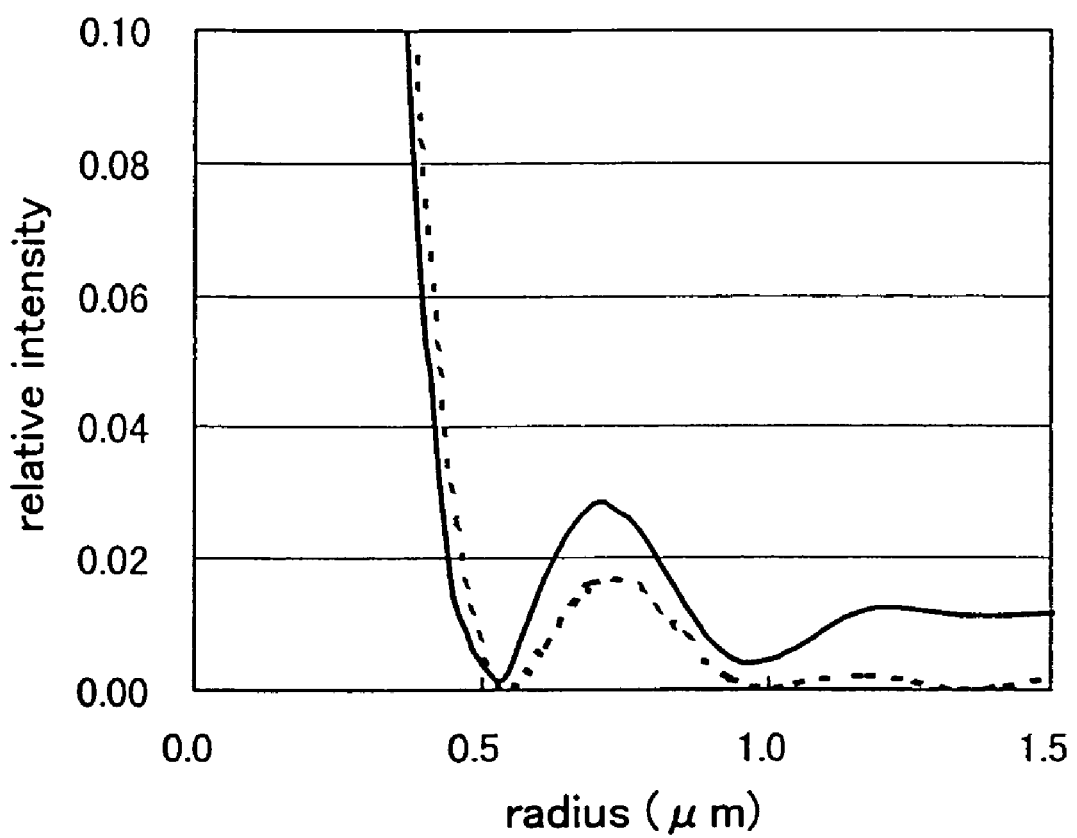
F I G. 8

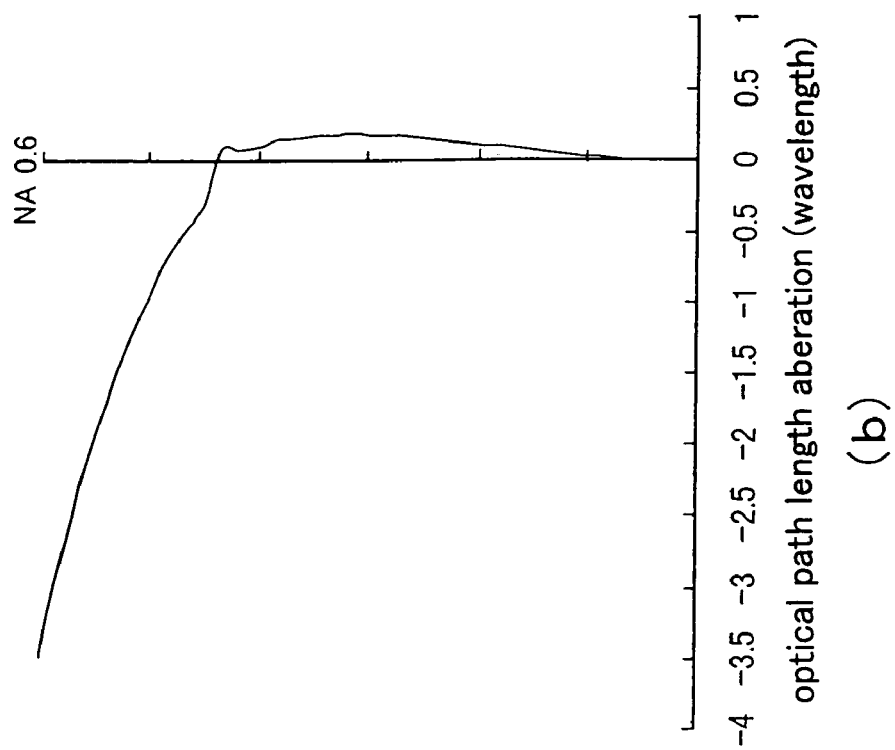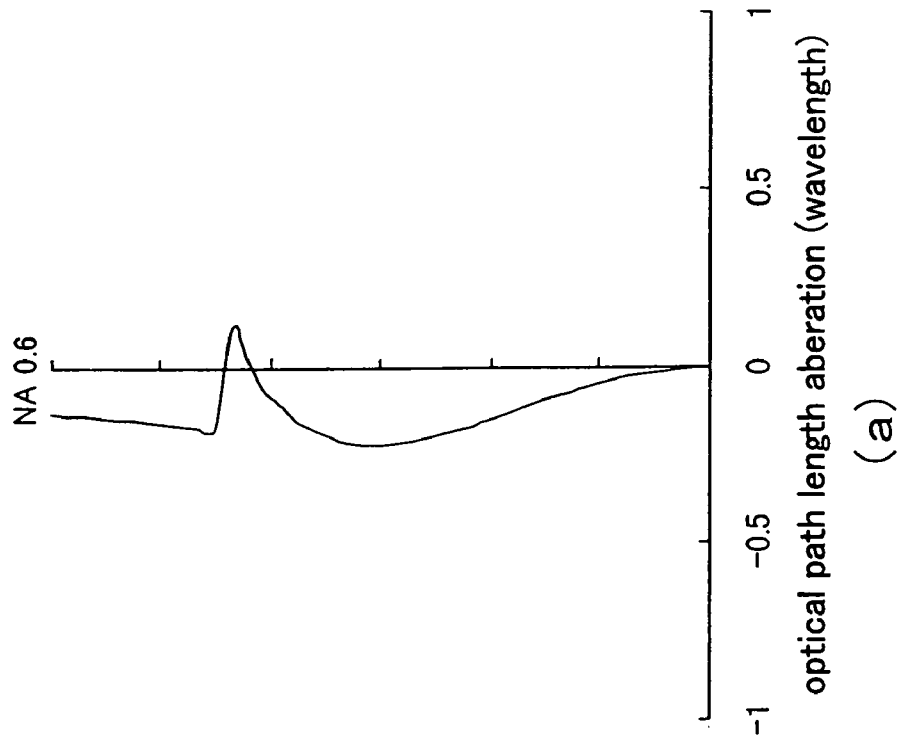
F I G. 9

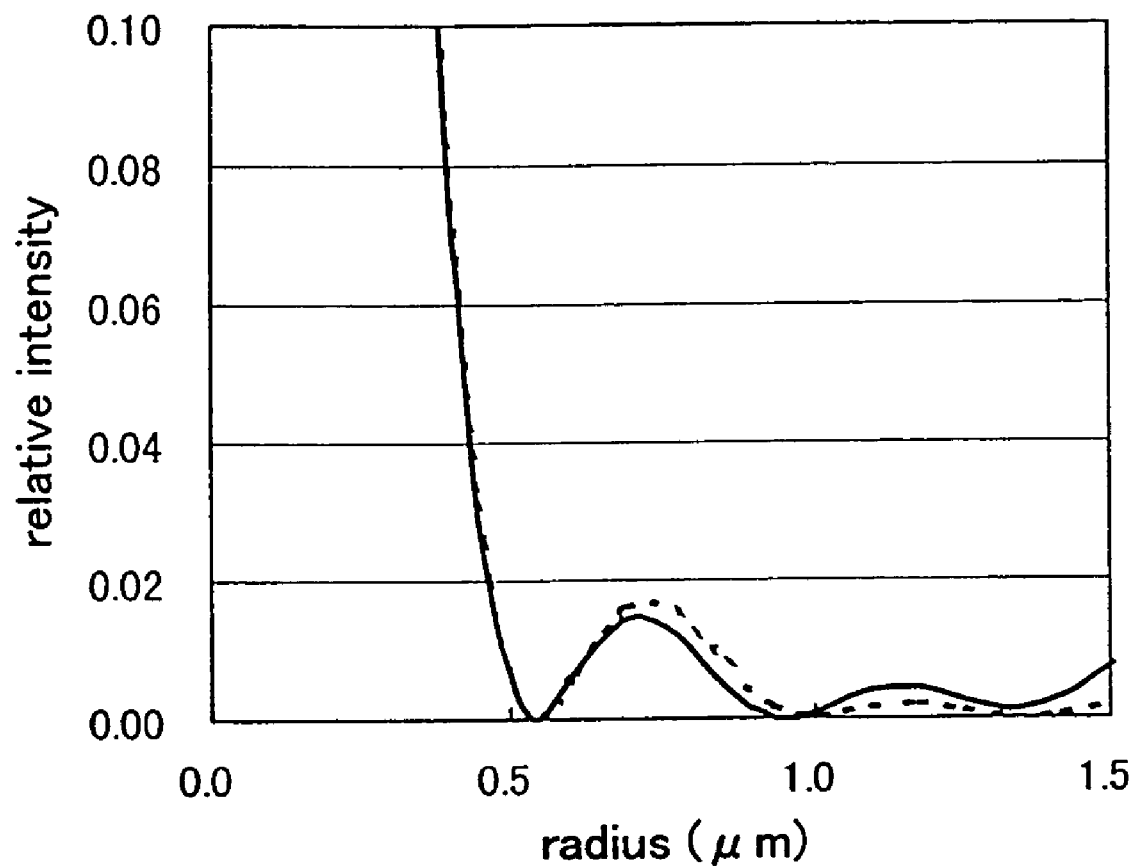
F I G. 10

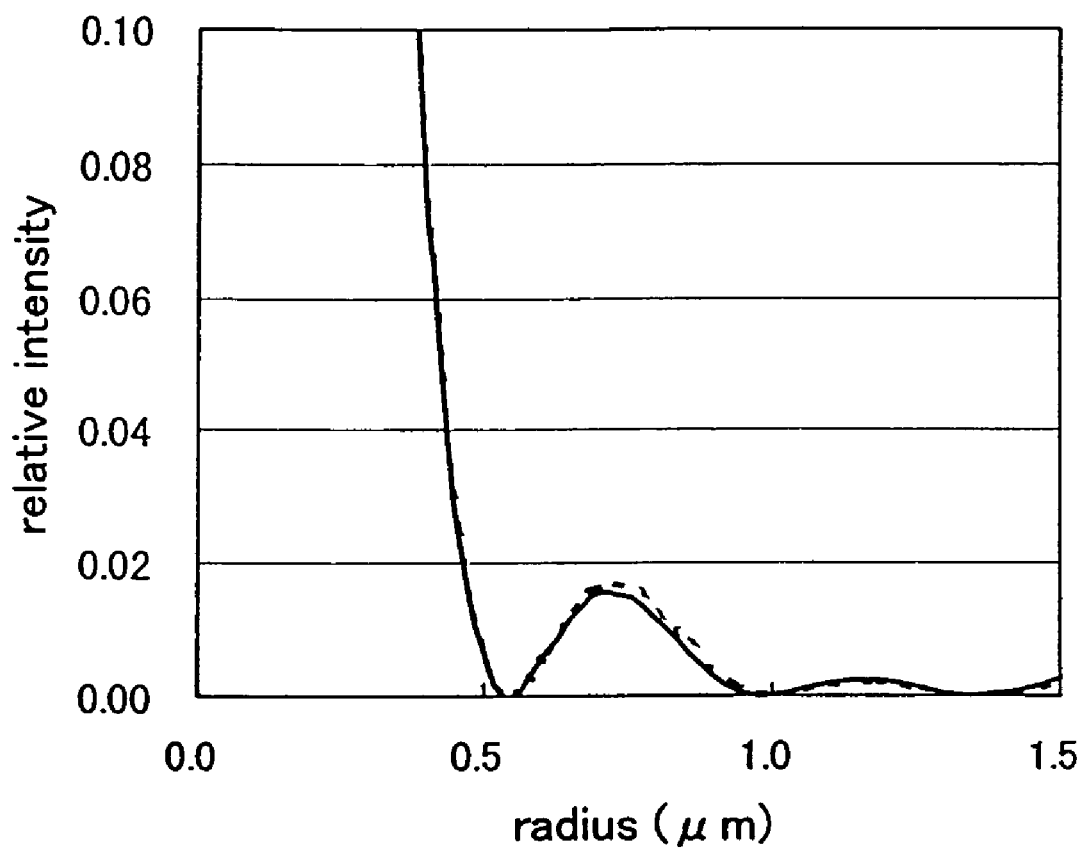
F I G. 1 4

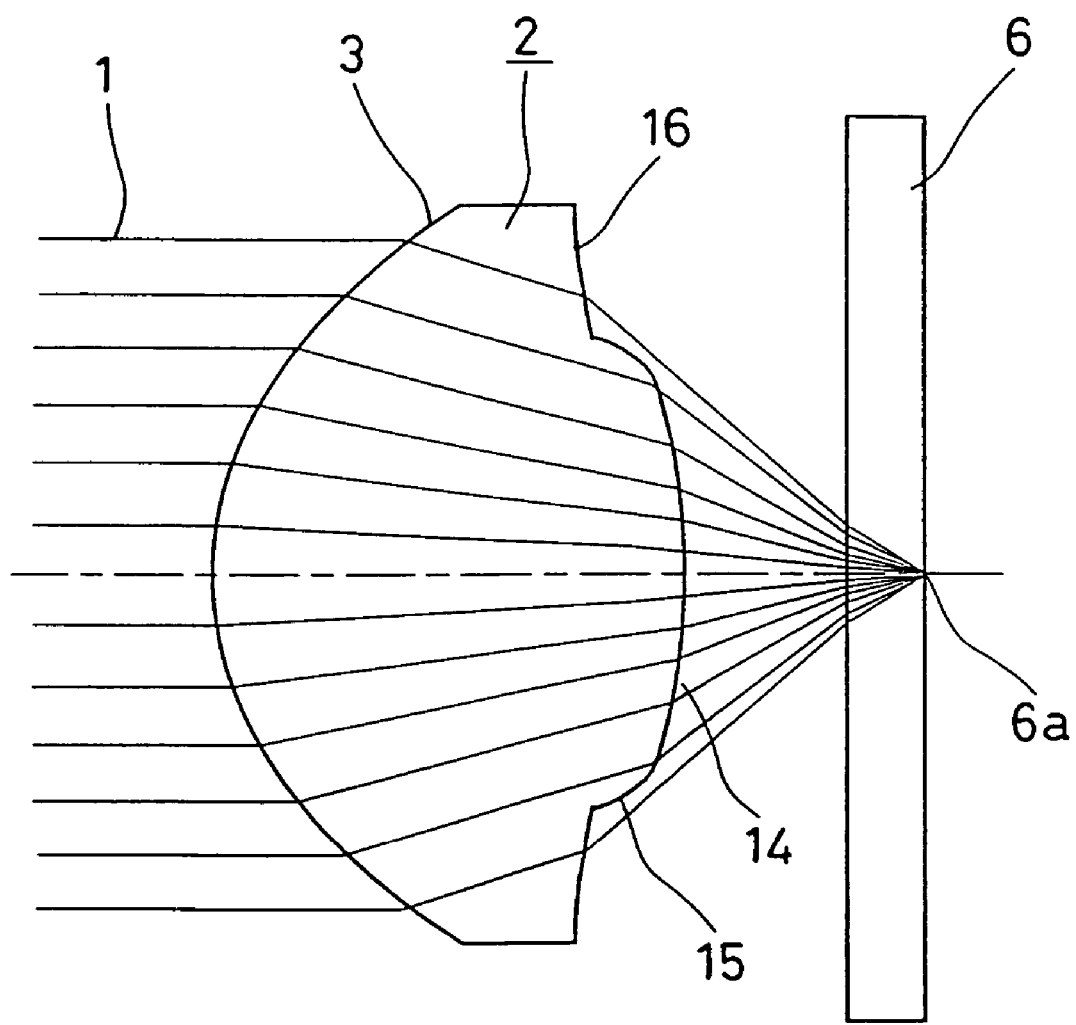
F I G. 1 5

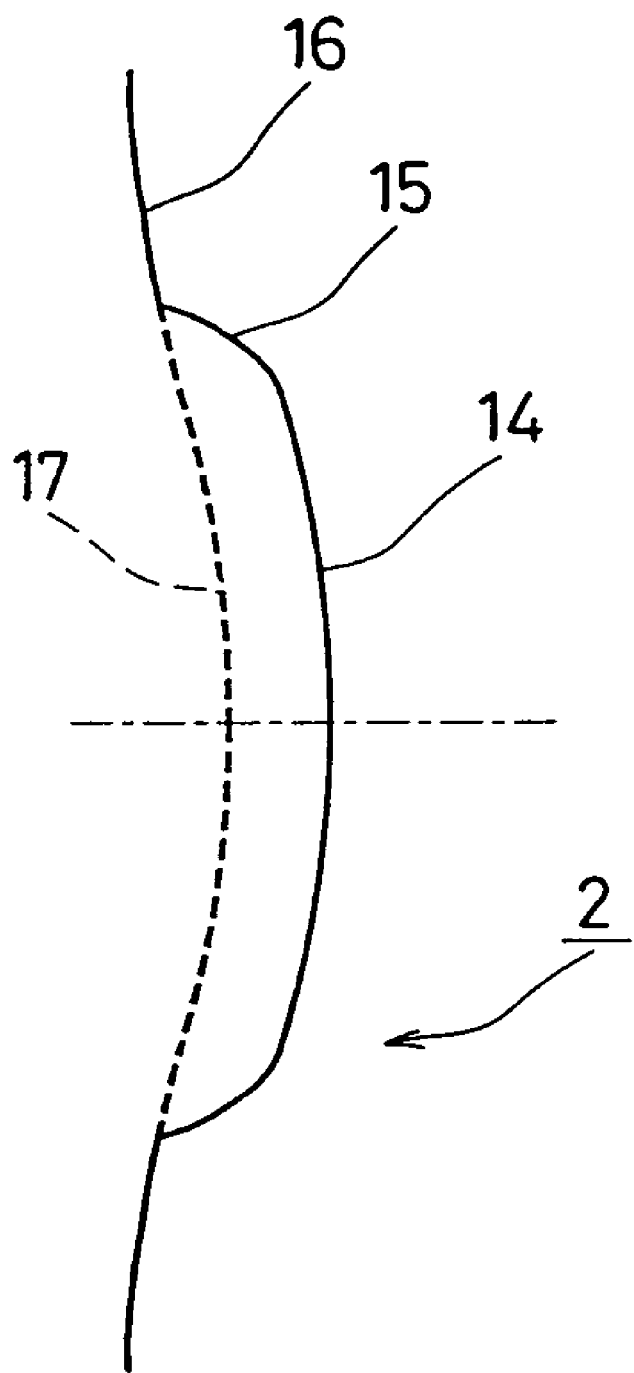
F I G. 1 6

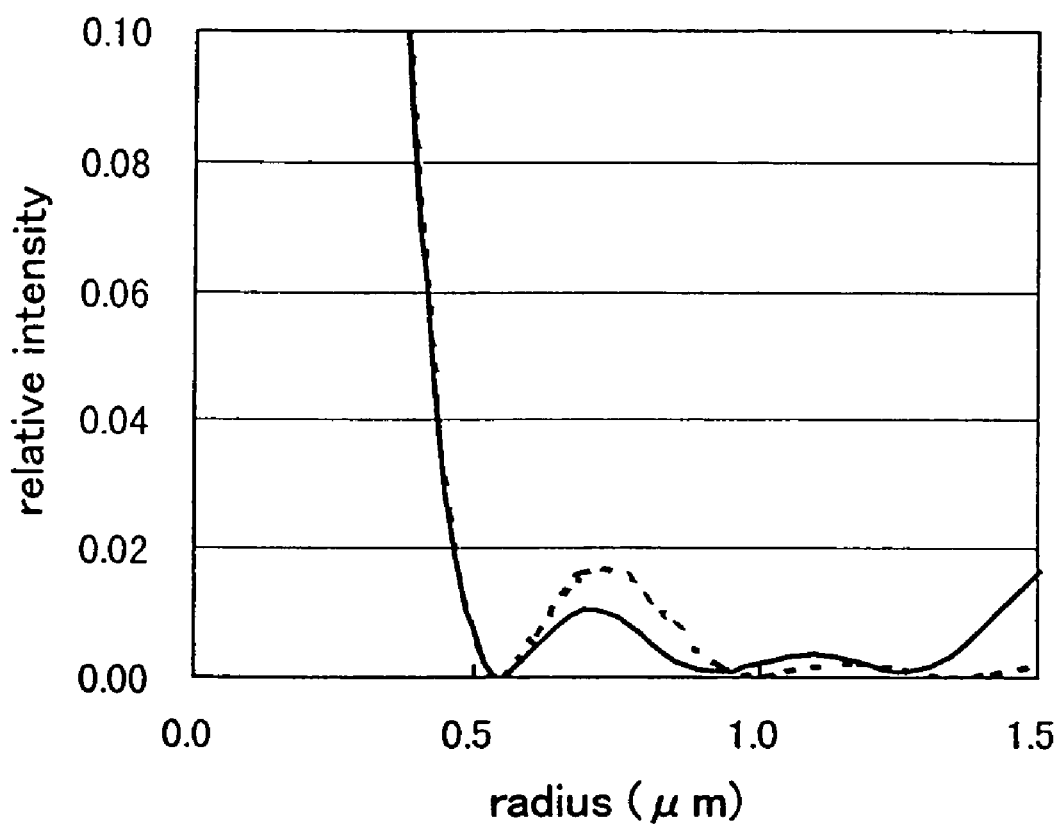
F I G. 1 8

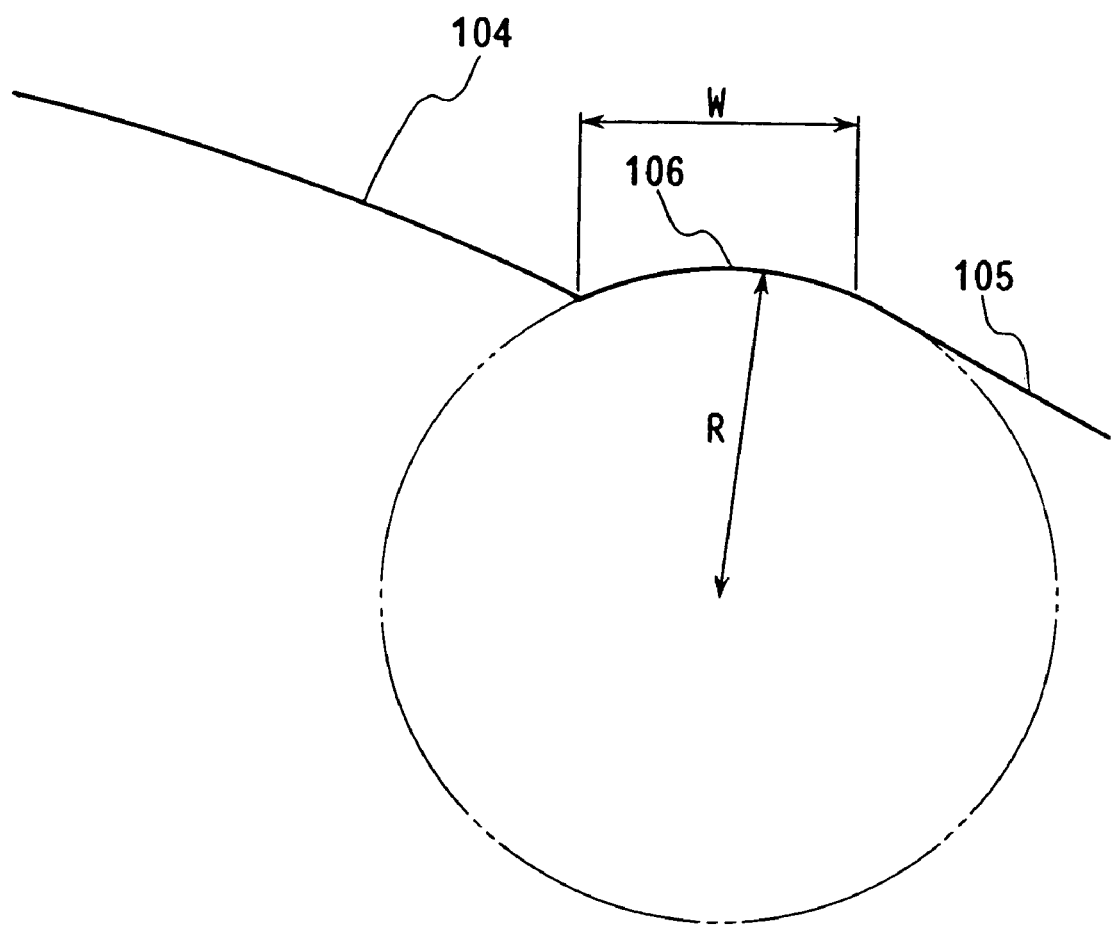
F I G. 21

(a)
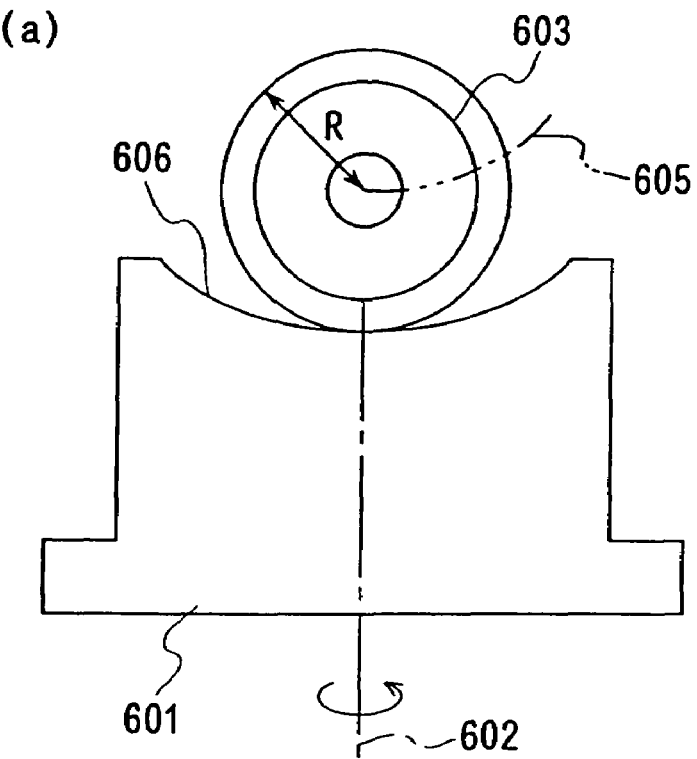
(b)
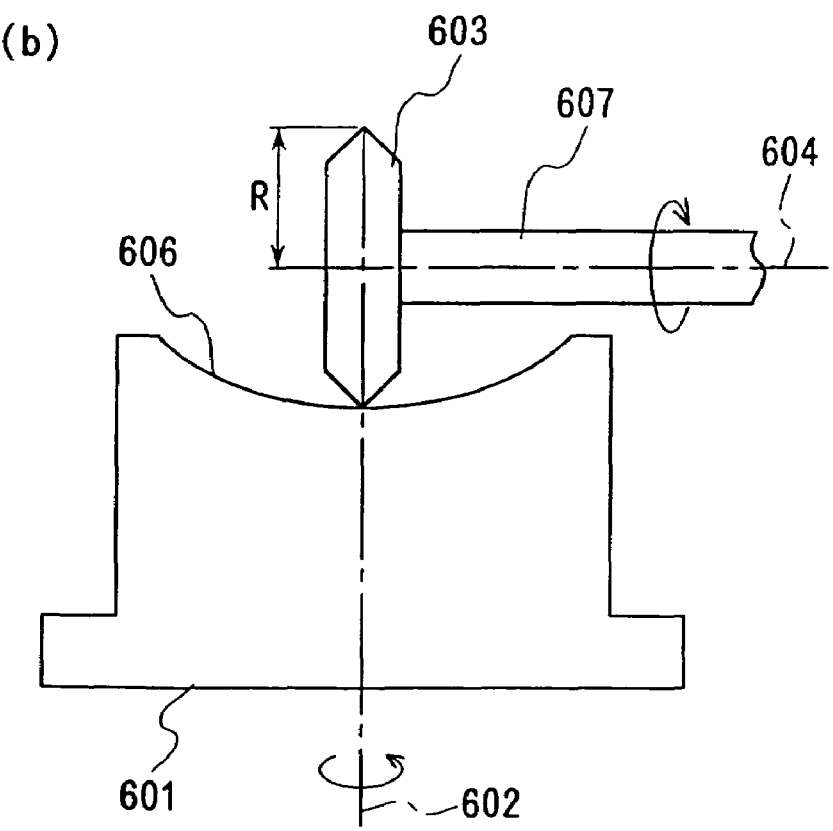
FIG. 25

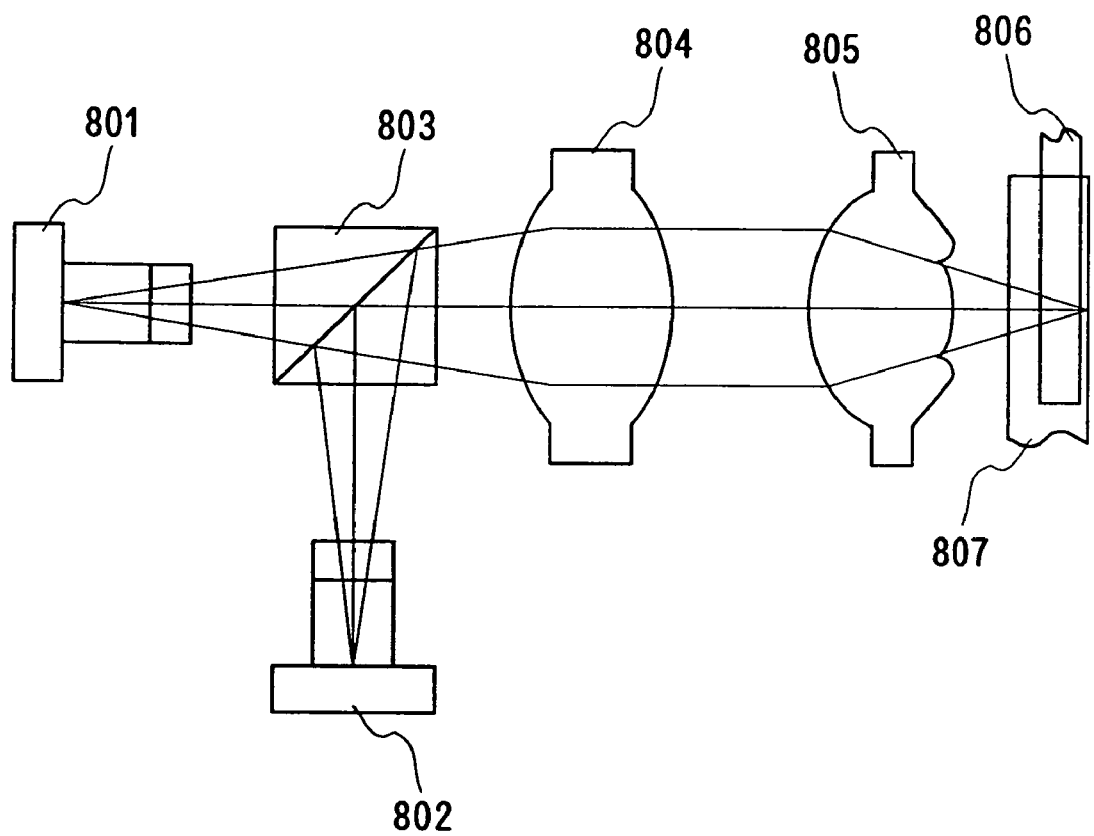
F I G. 2 7

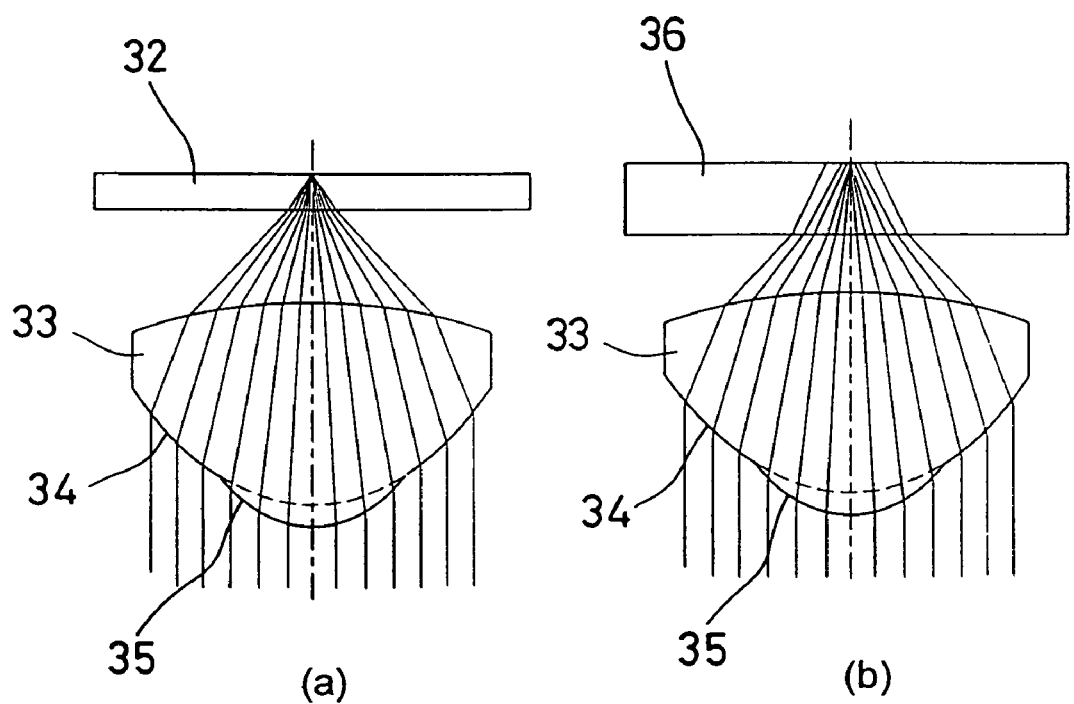
F I G. 2 8

OBJECTIVE LENS FOR OPTICAL DISK

This application is a divisional of application Ser. No. 09/763,385, filed Feb. 21, 2001, now U.S. Pat. No. 6,829,209, which is a 371 of PCT/JP00/04076, filed Jun. 21, 2000.

TECHNICAL FIELD

The present invention relates to an objective lens for an optical disk used in an optical head for a digital video disk, a digital audio disk, an optical memory disk for a computer, and the like. In particular, the present invention relates to an objective lens for an optical disk including a single lens and capable of satisfying an excellent light focusing property in accordance with any two kinds of optical disks each having a different thickness, an optical head device and an optical information recording and reproducing device using the same, and a mold for molding an objective lens, a method for working the mold and a profile measuring device for measuring the profile of the mold.

BACKGROUND ART

In general, an optical head device for an optical disk often employs a single lens having an aspheric surface as an objective lens for recording or reproducing information by focusing light beams into a diffraction limited point image on an information medium. However, in recent years, it is increasingly required to reproduce data compatibly with optical disks each having a different thickness. For example, it is required to read a CD (compact disk) or a CD-ROM having a disk thickness of 1.2 mm and a DVD (digital versatile disk) or DVD-ROM having a disk thickness of 0.6 mm by a single optical head. In this case, one method is to use two objective lenses, one lens corresponding to and one lens corresponding to the CD or CD-ROM having a disk thickness of 1.2 mm and one lens corresponding to the DVD or DVD-ROM having a disk thickness of 0.6 mm. However, from the viewpoint of simplifying an optical system, it is advantageous to use a single lens that is applicable for two kinds of optical disks each having a different thickness. In other words, in the optical head using two objective lenses, since a mechanism for switching lenses is needed, the configuration of the optical head becomes complicated, thus making it difficult to achieve a small size and low cost. Furthermore, it is desirable that the objective lens be as simple as possible.

For example, in JP8 (1996)-334690A and JP9 (1997)-184975A, a so-called two-zone divided type lens is disclosed as an objective lens in order to attain the above-mentioned object. In this configuration, a lens is divided into two regions, in which an inner circumference portion is designed to be suitable for use with a CD or CD-ROM, and an outer circumference region is designed to be suitable for use with a DVD or DVD-ROM. Hereinafter, a conventional objective lens will be described with reference to FIG. 28. FIG. 28 is a view of an arrangement showing a relationship between an objective lens and an optical disk in the prior art.

FIG. 28(a) is a view showing an optical path of a two-sided aspheric objective lens 33 when a light beam is focused onto an optical disk 32 having a thickness of 0.6 mm. The surface of the objective lens at the side of the light source includes an outer circumference region 34 and an inner circumference region 35. In the outer circumference region 34, the spherical aberration is corrected with respect to the optical disk 32 having a thickness of 0.6 mm. On the other hand, in the inner circumference region 35, the spherical aberration is corrected with respect to the optical disk having a thickness of 0.9 mm. The boundary between the inner circumference region 35 and the outer circumference region 34 is determined by the NA that is necessary to reproduce data of the disk having a thickness of 1.2 mm for a light source of a wavelength of 655 nm. For example, when an optical disk having a thickness of 1.2 mm is reproduced at a wavelength of 780 nm and a NA of 0.45, the NA of the light source of 655 nm is about 0.37. The inner circumference region 35 has a spherical aberration with respect to the optical disk having a thickness of 0.6 mm. Herein, the total aberration is much smaller than 0.07 λ (which is called a diffraction limit) and falls in a sufficient aberration for reproducing the optical disk of a thickness of 0.6 mm.

FIG. 28(b) is a view showing an optical path when a light beam is focused onto an optical disk 36 having a thickness of 1.2 mm by using the same objective lens 33. Since the inner circumference region 35 of the same objective lens 33 is optimized with respect to an optical disk having a thickness of 0.9 mm, the aberration is small for the optical disk 36 having thickness of 1.2 mm. However, since the outer circumference region 34 is optimized with respect to an optical disk 32 having a thickness of 0.6 mm, the aberration is large for the optical disk 36 having a thickness of 1.2 mm, so that it does not contribute to the light focusing. Therefore, the outer circumference region 34 also functions as an aperture.

When there is one light source, under the above-mentioned conditions, sufficient performance with respect to two kinds of optical disks each having a thickness of 0.6 mm and 1.2 mm respectively can be attained. However, when it is necessary to reproduce the optical disk having a thickness of 1.2 mm by using the light source of 780 nm like CD-R, the wavelength becomes longer. Consequently, it is necessary to increase the NA relatively, so that the aberration with respect to the optical disk having a thickness of 0.6 mm becomes larger, thus deteriorating the focusing property.

Furthermore, not shown in FIG. 28, a mold for molding an objective lens with a difference in level between an inner circumference portion and an outer circumference portion has been produced by cutting with the use of a diamond cutting tool in order to precisely work a portion having the difference in level.

Furthermore, in a profile measuring device for measuring and evaluating the worked mold, a rotationally symmetric aspheric surface is used as design profile data which is reference data for evaluating measurement values. When a zone-divided type objective lens is measured, the inner circumference portion and the outer circumference portion are measured separately, or a fitting of the profiles of the inner circumference portion and the outer circumference portion is carried out by the use of a higher order aspheric coefficient of about 20-th order to express the profile and the profile is compared with the measurement values.

When the above-mentioned zone-divided type objective lens has the portion having the difference in level between an aspheric surface of the inner circumference portion and an aspheric surface of the outer circumference portion, an ideal design is to provide a surface forming the difference in level approximately parallel to the optical axis. However, in actual working, it is necessary to weaken the surface forming the difference in level to such an extent that the portion having the difference in level can be worked. JP 9 (1997)-184975A discloses the profile in which the portions having the difference in level are smoothly connected. However, it is a profile in which an aspheric surface of the inner circumference portion and an aspheric surface of the outer circumference portion are weakened approximately uniformly. Such a profile can be obtained only by cutting with the use of a cutting tool. Herein, in cutting with the use of the cutting tool, there is a limitation on the type of metal material that can be worked. Unless a relatively soft metal having excellent cutting properties is used, a sufficient working accuracy cannot be obtained. On the other hand, for press molding the lens from a glass material, it is necessary to mold the lens at high temperature and high pressure. It is desirable that a metal material having high hardness, such as a cemented carbide (a sintered metal including WC as a main component) is used. However, the cemented carbide cannot be worked by cutting with the use of cutting tool. In other words, the zone-divided type objective lenses, which have been proposed to date, have a profile for plastic molding. Therefore, most of the conventional objective lenses molded by the use of glass materials have a difficulty in working a mold.

Furthermore, the refractive index of the lens using a plastic material is changed greatly due to a change in temperature. For example, in an optical head device that is necessary to secure operation in a wide range of temperatures, for example, for vehicle apparatus, in general, glass lens is used. However, as mentioned above, a zone divided type DVD/CD compatible lens is designed based on plastic molding. Thus, the temperature characteristics are extremely deteriorated.

Furthermore, in a profile measuring device for measuring and evaluating a mold for molding a lens, the measured profile and the preliminary stored design profile are compared with each other and a working error is calculated. However, a design profile that can be input is only a profile such as a rotationally symmetric aspheric surface. In the method for measuring the zone divided type objective lens by separating the inner circumference portion and the outer circumference portion, since the entire area of the lens is not measured at one time, it is impossible to know the error in profile exactly. Furthermore, in the method of measuring the profile of the entire lens by expressing the profile of the entire lens by fitting with the use of a higher order aspheric coefficient and using this aspheric profile as a design profile, the fitting error occurs around the portion having the difference in level, and thus sufficient measuring accuracy cannot be obtained.

DISCLOSURE OF INVENTION

It is an object of the present invention to provide an objective lens for an optical disk including one lens and capable of satisfying an excellent focusing property in accordance with any optical disks each having a different thickness, an optical head apparatus and an optical information recording and reproducing device using the same. It is another object of the present invention to provide a zone-divided type objective lens made of a glass material and excellent in productivity. It is a further object of the present invention to provide a mold for molding the zone-divided type objective lens using cemented carbide capable of being resistant to the molding of glass materials and a method for working the mold. It is a still further object of the present invention to provide a profile measuring device capable of evaluating the profile of the mold for molding the zone-divided objective lens exactly.

In order to achieve the above-mentioned objects, a first configuration of an objective lens for an optical disk according to the present invention includes a single lens having aspheric surfaces on both sides and focusing light beams into a point image through first and second optical disk substrates each having a different thickness, at least one aspheric surface including two regions of an inner circumference region at the inner side of a circular aperture having an optical axis as a center and an outer circumference region located on an outer side with respect to the inner circumference region, the aspheric profile of the outer circumference region correcting a spherical aberration with respect to the first optical disk substrate having a smaller thickness among the first and second optical disk substrates, the aspheric profile of the inner circumference region correcting a spherical aberration with respect to the second optical disk substrate having a larger thickness, and the outer circumference region and the inner circumference region are in contact with each other at the boundary therebetween with a difference in level in the direction of the optical axis, wherein the objective lens satisfies the following relationships (1) to (4);

$$t1 < t2 \tag{1}$$

$$0.05 < TW < 0.12 \tag{2}$$

$$0.38 < NA1 < 0.46 \tag{3}$$

$$0.1 < p(n-1)/\lambda < 0.6 \tag{4}$$

wherein t1 denotes a thickness of the first optical disk substrate, t2 denotes a thickness of the second optical disk substrate, NA1 denotes a NA of the objective lens at the aperture of the inner circumference region, TW denotes a wavefront aberration when light beams are focused through the first optical disk substrate (unit is λ: rms), n denotes a refractive index of the objective lens at the wavelength of a light source when data of the first optical disk are reproduced, p denotes a difference in level between the inner circumference region and the outer circumference region in the direction of the optical axis; and λ denotes a wavelength of the light source when data of the first optical disk are reproduced.

According to the first configuration of the objective lens for an optical disk, it is possible to obtain an excellent focusing spot with respect to the first optical disk and the second optical disk with one lens. As a result, excellent recording and reproducing characteristics can be obtained.

Furthermore, it is preferable in the first configuration of the objective lens for an optical disk of the present invention that the third order spherical aberration component S3 of the wavefront aberration is approximately 0 when light beams are focused through the first optical disk substrate. According to this preferable configuration, it is possible to minimize the deterioration in performance with respect to an error in the substrate thickness of the optical disk.

Furthermore, it is preferable in the first configuration of the objective lens for an optical disk of the present invention that a fifth order spherical aberration component S5 (unit is λ: rms) of the wavefront aberration satisfies the following relationship (5) when light beams are focused through the first optical disk substrate.

$$-0.03 < S5 < 0.03 \tag{5}$$

According to this preferable configuration, it is possible to suppress the light focusing property, in particular, the peak intensity of an Airy ring when the first optical disk is reproduced. Consequently, the deterioration of the reproducing characteristics of the optical disk can be prevented.

Furthermore, it is preferable in the first configuration of the objective lens for an optical disk of the present invention that the thickness t3 of the optical disk substrate satisfies the following relationship (6), when the aspheric profile of the inner circumference region is optimized so that the spherical aberration is corrected with respect to the thickness t3 of the optical disk substrate.

$$0.8 < t3 < 1.2 \tag{6}$$

According to this preferable configuration, it is possible to suppress the deterioration factor of the focusing spot for the first optical disk and to reduce the recording density of the second optical disk as compared with the first optical disk so as to reduce the effect of the coma aberration by the tilt of the second optical disk and to suppress the deterioration factor other than the spherical aberration.

Furthermore, it is preferable in the first configuration of the objective lens for an optical disk of the present invention that the cross section of the portion having the difference in level between the inner circumference region and the outer circumference region has a circular arc profile. According to this preferable configuration, working by using a cutting tool, a grindstone, or the like, can be carried out easily.

Furthermore, it is preferable that the first configuration of the objective lens for an optical disk of the present invention is formed by glass molding or plastic molding. According to this preferable configuration, it is possible to cheaply mass-produce lenses having the same profiles and the same performances by previously working a mold of the aspheric profile.

Furthermore, a second configuration of an objective lens for an optical disk according to the present invention includes a single lens having aspheric surfaces on both sides and focusing light beams into a point image through first and second optical disk substrates each having a different thickness, at least one aspheric surface including three regions composed of an inner circumference region at the inner side of a circular aperture having an optical axis as a center, a middle region located at an outer side with respect to the inner circumference region and surrounded by another circular aperture that is located at an outer side of the circular aperture, and an outer circumference region located at an outer side with respect to the middle region, the aspheric profiles of the inner circumference region and the outer circumference region correcting a spherical aberration with respect to the first optical disk substrate having a smaller thickness among the first and second optical disk substrates, and the aspheric profile of the middle region correcting a spherical aberration with respect to an optical disk substrate having a thickness that is larger than the thickness of any of the first and second optical disk substrates, wherein the objective lens for an optical disk satisfies the following relationships (7) and (8);

$$0.35 < NA2 < 0.43 \tag{7}$$

$$0.03 < NA3NA2 < 0.1 \tag{8}$$

wherein NA2 denotes a NA of the objective lens at the boundary between the inner circumference region and the middle region, and NA3 denotes a NA of the objective lens at the boundary between the middle region and the outer circumference region.

According to the second configuration of the objective lens for an optical disk, it is possible to obtain an excellent focusing spot with respect to the first optical disk and the second optical disk with one lens. As a result, excellent recording and reproducing characteristics can be obtained.

Furthermore, it is preferable in the second configuration of the objective lens for an optical disk of the present invention that the thickness t4 of the optical disk substrate satisfies the following relationship (9), when the aspheric profile of the middle region is optimized so that the spherical aberration is corrected with respect to the thickness t4 of the optical disk substrate.

$$1.4 < t4 < 2.0 \tag{9}$$

According to this preferable configuration, it is possible to correct an aberration with respect to the second optical disk excellently.

Furthermore, it is preferable in the second configuration of the objective lens for an optical disk of the present invention that either the boundary in which the inner circumference region is connected to the middle region or the boundary in which the middle region is connected to the outer circumference region dose not have a difference in level. According to this preferable configuration, it is possible to secure the quantity of light by reducing the ineffective portion occurring at the time of working a lens and to suppress the deterioration of the light focusing property.

Furthermore, it is preferable in the second configuration of the objective lens for an optical disk of the present invention that the cross section of the portion having a difference in level between the inner circumference region and the middle region or the cross section of the portion having a difference in level between the middle region and the outer circumference region has a circular arc profile.

Furthermore, it is preferable in the second configuration of the objective lens for an optical disk of the present invention that the objective lens is formed by glass molding or plastic molding.

Furthermore, a third configuration of an objective lens for an optical disk according to the present invention includes a single lens having aspheric surfaces on both sides and focusing light beams into a point image through first and second optical disk substrates each having a different thickness, at least one aspheric surface including three regions composed of an inner circumference region at the inner side of a circular aperture having an optical axis as a center, a middle region located at an outer side with respect to the inner circumference region and surrounded by another circular aperture that is located at an outer side of the circular aperture, and an outer circumference region located at an outer side with respect to the middle region, the aspheric profiles of the inner circumference region and the outer circumference region correcting a spherical aberration with respect to the first optical disk substrate having a smaller thickness than the second optical disk substrate, the thickness t5 of the optical disk substrate satisfies the following relationship (10) when the aspheric profile of the middle region is optimized so that the spherical aberration is corrected with respect to the thickness t5 of the optical substrate, and the outer circumference region is formed with a difference in level corresponding to an integral multiple of the optical path length in the direction of an axis with respect to the inner circumference region, wherein the objective lens satisfies the following relationships (11) to (13).

$$1.0 < t5 < 1.4 \tag{10}$$

$$t1 < t2 \tag{11}$$

$$0.35 < NA2 < 0.43 \tag{12}$$

$$0.03 < NA3NA2 < 0.1 \tag{13}$$

wherein t1 denotes a thickness of the first optical disk substrate, t2 denotes a thickness of the second optical disk substrate, NA2 denotes a NA of the objective lens at the boundary between the inner circumference region and the middle region, and NA3 denotes a NA of the objective lens at the boundary between the middle region and the outer circumference region.

According to the third configuration of the objective lens for an optical disk, it is possible to obtain an excellent focusing spot with respect to the first optical disk and the second optical lens with one disk. As a result, excellent recording and reproducing characteristics can be obtained.

Furthermore, it is preferable in the third configuration of the objective lens for an optical disk of the present invention that the focal position in which a wavefront aberration of the inner circumference region is minimized and the focal position in which a wavefront aberration of the outer circumference region is minimized are the same when light beams are focused through the second optical disk substrate. According to this preferable configuration, when light beams reflected from an information medium surface are incident in a photodetector, they return to the same portions with respect to the inner circumference region and the outer circumference region. As a result, it is possible to obtain an accurate signal light.

Furthermore, it is preferable in the third configuration of the objective lens for an optical disk of the present invention that the third order spherical aberration component S3 of the wavefront aberration in the ranges of the inner circumference region and the middle region is approximately 0 when light beams are focused through the second optical disk substrate. According to this preferable configuration, it is possible to record and reproduce the second optical disk excellently.

Furthermore, it is preferable in the third configuration of the objective lens for an optical disk of the present invention that the boundary in which the inner circumference region is connected to the middle region does not have a difference in level.

Furthermore, it is preferable in the third configuration of the objective lens for an optical disk of the present invention that the boundary between the middle region and the outer circumference region is provided at the intersection point of the profiles of the middle region and the outer circumference region. Furthermore, it is preferable in the third configuration of the objective lens for an optical disk of the present invention that both the boundary in which the inner circumference region is connected to the middle region and the boundary in which the middle region is connected to the outer circumference region do not have a difference in level. According to such a preferable configuration in which the boundary between the middle region and the outer circumference region is provided at the intersection point of the profiles of the middle region is connected to the outer circumference region and both the boundary in which the inner circumference region is connected to the middle region and the boundary in which the middle region is connected to the outer circumference region do not have a difference in level, it is possible to facilitate the work by removing a portion having the difference in level from the aspheric profile and to suppress the loss of the quantity of light by removing the ineffective region from the surface profile.

Furthermore, it is preferable in the third configuration of the objective lens for an optical disk of the present invention that the objective lens is produced by glass molding or plastic molding.

As mentioned above, in the first to third configurations of the objective lens for an optical disk of the present invention, the aberration correction of a single lens is designed so as to obtain a focusing performance necessary to the substrate thickness of two optical disks, respectively. In the aberration of the lens having a smaller thickness of the optical disk substrate and a higher NA, since it is necessary to take the aberration at the optical disk having a large thickness into account, the total aberration becomes larger than is conventional. However, in this aberration, by designing the different profiles in the outer circumference region and the inner circumference region, and at the same time by providing the boundary between the outer circumference region and the inner circumference region with the surface forming the difference in level in the direction of the optical axis, it is possible to maintain the profile of the spot at the side of the optical disk in which information is recorded with a high density. Furthermore, in the aberration of the lens having a larger thickness of the optical disk substrate and lower recording density and lower NA, by suppressing the aberration in the necessary aperture sufficiently and deteriorating the aberration rapidly at the outside of the necessary aperture, it is possible to provide the same effect as having a diaphragm. As a result, it is possible to record information or reproduce information with a stable performance.

Furthermore, a first configuration of an optical head device according to the present invention includes two light sources, a focusing means for focusing light beams emitted from the two light sources onto the information medium surface through first and second optical disk substrates each having a thickness corresponding to the respective light source, a light flux separating means for separating light fluxes modulated at the information medium, and a light receiving means for receiving the light beams modulated at the information medium, wherein the focusing means is one of the first to third configurations of the objective lens for an optical disk according to the present invention.

Furthermore, a configuration of an optical information recording and reproducing apparatus according to the present invention, recording information on the information medium of surfaces of the first and second optical disk substrates each having a different thickness, or reproducing information recorded on the information medium surfaces by the use of an optical head deice, wherein the first configuration of the optical head device according to the present invention is used as the optical head device.

According to the first configuration of the optical head device and the configuration of the optical information recording and reproducing apparatus, since it is possible to record and reproduce information with one objective lens with respect to two kinds of optical disks each having a different substrate thickness, a cheap optical head device and optical information recording and reproducing apparatus can be realized. Furthermore, by providing any of the optical disks with aberration suitable to each disk in accordance with the aperture of the objective lens, it is possible to obtain an excellent recording, reproducing and erasing performance with respect to the two kinds of optical disks with one objective lens.

Furthermore, a fourth configuration of an objective lens for an optical disk according to the present invention includes a single lens made of glass and which focuses light beams into a point image through first and second optical disk substrates each having a different thickness, at least one surface is divided into at least three regions by concentric circles having an optical axis as a center, and among the three regions, a first region including the optical axis and a second region located at an outermost part are rotationally symmetric aspheric surfaces, and a third region sandwiched by the first region and the second region is a toric surface having the optical axis as an axis of rotation. According to the fourth configuration of the objective lens for an optical disk, various advantageous are provided as compared with a conventional two-zone divided type objective lens having a sharp difference in level. In other words, since the conventional objective lens has a sharp difference in level, it is required that the mold must be worked by the use of a diamond cutting tool. As a result, material to be molded is limited. However, according to the fourth configuration of the objective lens for an optical disk, since a portion having a difference in level is formed by the toric surface having the optical axis as an axis of rotation, it is possible to work the mold with a grindstone. Thus, it is possible to produce a lens by using a glass material to be molded at high temperature and high pressure.

Furthermore, it is preferable in the fourth configuration of the objective lens for an optical disk of the present invention that the third region that is the toric surface is in contact with the second region and intersects the first region.

Furthermore, it is preferable in the fourth configuration of the objective lens for an optical disk the present invention that aspheric coefficients of the first region and the second region are different from each other.

Furthermore, it is preferable in the fourth configuration of the objective lens for an optical disk of the present invention that the toric surface is provided on the surface having a larger central radius of curvature of the lens.

Furthermore, it is preferable in the fourth configuration of the objective lens for an optical disk of the present invention that the third region is a toric surface obtained by rotating a circular arc with an optical axis as a center, the circular arc having a radius R satisfying the following relationship (14).

$$0.7 \text{ mm} < R < 2.5 \text{ mm} \tag{14}$$

When R is 0.7 mm or less, a mold cannot be worked by grinding work, thus making it difficult to produce the lens. On the other hand, when R is 2.5 mm or more, the width of the arc circular portion is too broad, thus deteriorating the performance of the lens.

Furthermore, it is preferable in the fourth configuration of the objective lens for an optical disk of the present invention that the third region is a toric surface obtained by rotating a circular arc with an optical axis as a center, the circular arc having a radius R satisfying the following relationship (15).

$$1.6 \text{ mm} < R < 2.1 \text{ mm} \tag{15}$$

Furthermore, it is preferable in the fourth configuration of the objective lens for an optical disk of the present invention that the width w of the third region satisfies the following relationship (16).

$$0.02 \text{ mm} < w < 0.04 \text{ mm} \tag{16}$$

When w is 0.02 mm or less, the lens has a profile that cannot be worked by using a grindstone, thus making it difficult to produce the lens. On the other hand, when w is 0.04 mm or more, the difference in profile between an actually obtained lens and an ideally designed lens is too large, and thus sufficient lens performance cannot be exhibited.

Furthermore, a second configuration of the optical head device according to the present invention includes a first light source emitting light beams having a first wavelength, a second light source emitting light beams having a second wavelength different from the first wavelength, a focusing means for focusing light beams from the first and second light sources onto an information recording medium, a first light receiving means for receiving the light beams having the first wavelength among the reflecting light beams from the information recording medium and a second light receiving means for receiving the light beams having the second wavelength, wherein the focusing means is the fourth embodiment of the objective lens for an optical disk according to the present invention.

According to the second configuration of the optical head device, since the fourth configuration of the optical lens for an optical disk of the present invention is used, it has the following advantageous over the optical head device using the conventional zone-divided type objective lens. Namely, since the fourth embodiment of the objective lens for an optical disk of the present invention is an objective lens made of a glass material having less deterioration in the aberration due to a change in temperature, for example, it is possible to realize an optical head device necessary to secure an operation under a wide range of temperature conditions, for example, for a vehicle apparatus, etc. Furthermore, as mentioned above, the production cost of the mold can be reduced as compared with a conventional objective lens, and furthermore, a longer lifetime of the mold is expected to be attained. Consequently, it is possible to reduce the production cost of an objective lens and in turn the production cost of the optical head device.

Furthermore, a configuration of a mold for molding a lens according to the present invention is as follows. The mold is produced by grinding cemented carbide. A lens molding surface is divided into at least three regions by concentric circles having an optical axis as a center, and among the three regions, a first region including the optical axis and a second region located at an outermost part are rotationally symmetric aspheric surfaces, the third region which is sandwiched by the first region and the second region is a toric surface having the optical axis as an axis of rotation. According to the configuration of the mold for molding the lens, various advantages are obtained over the conventional two-zone divided type objective lens, because a portion having a difference in level is formed of the toric surface having the optical axis as an axis of rotation. Namely, production by using the grindstone is possible and a superhard material suitable for molding a glass material can be used as a material for the mold. Furthermore, since there is no roughness having a small vertex radius of curvature within an effective diameter, it is possible to carry out profile measuring at high accuracy by the use of a probe having a tip radius of curvature of about 500 μm.

Furthermore, it is preferable in the configuration of the mold for molding the lens of the present invention that the radius of curvature R of the toric surface having the optical axis as an axis of rotation satisfies the following relationship (17).

$$0.7 \text{ mm} < R < 2.5 \text{ mm} \tag{17}$$

Furthermore, it is preferable in the configuration of the mold for molding the lens of the present invention that the radius of curvature R of the toric surface having the optical axis as an axis of rotation satisfies the following relationship (18).

$$1.6 \text{ mm} < R < 2.1 \text{ mm} \tag{18}$$

If a grindstone having a radius that is the same as or smaller than the above-mentioned radius of curvature R is used, grinding work can be possible. Therefore, a cemented carbide (for example, a sintered metal including WC as a main component) capable of molding a high melting glass material under high pressure can be used as a material for the mold.

Furthermore, a method for working a mold for molding a lens according to the present invention includes grinding a lens molding surface of the mold for molding the lens by the use of a diamond grindstone. The lens molding surface is divided into at least three regions by concentric circles having an optical axis as a center, and among the three regions, a first region including the optical axis and a second region located at an outermost part being rotationally symmetric aspheric surfaces, and the third region which is sandwiched by the first region and the second region being a toric surface having the optical axis as an axis of rotation. A radius of the diamond grindstone used for the grinding work is the same as or smaller than the radius of curvature of the toric surface. According to the method for working a mold for molding a lens, since the method includes grinding work using a diamond grindstone, it is possible to produce a two-zone divided type mold for molding a lens which is made of a cemented carbide.

Furthermore, it is preferable in the method for working a mold for molding a lens of the present invention that the radius R of the diamond grindstone satisfies the following relationship (19).

$$0.7 \text{ mm} < R < 2.5 \text{ mm} \quad (19)$$

When R is 0.7 mm or less, the diameter of a grindstone is too thin, and the accuracy of the worked surface becomes bad. On the other hand, when R is 2.5 mm or more, the toric surface region (connecting region) is broadened, and the aberration of the molded lens is deviated greatly from the design value.

Furthermore, it is preferable in the method for working a mold for molding a lens of the present invention that the radius R of the diamond grindstone satisfies the following relationship (20):

$$1.6 \text{ mm} < R < 2.1 \text{ mm} \quad (20)$$

When the radius R of the grindstone is within this range, it is possible to reduce the width of the toric surface region and at the same time to maintain the diameter of the grindstone so as to have a sufficient intensity.

Furthermore, a configuration of a profile measuring device according to the present invention includes a precision stage, a controller for controlling the precision stage, a length measuring means, a means for inputting design profile data, and a means for outputting a difference between the design profile data and measured data; wherein as the design profile data, a first rotationally symmetric aspheric surface is used in the region where the distant from the optical axis is less than the radius $h_1$, a second rotationally symmetric aspheric surface is used in the region where the distance from the optical axis is not less than the radius $h_2$, and a toric surface having the optical axis as a rotationally symmetric axis is used in the region between the radius $h_1$, and the radius $h_2$. According to the configuration of the profile measuring device, it is possible to express one surface profile by using three surfaces including an inner aspheric surface, an outer aspheric surface and a toric surface having the optical axis of the middle region between the inner aspheric surface and outer aspheric surface as an axis of rotation. Therefore, the profile measuring device of the present invention has various advantages over the conventional profile evaluating device. In other words, when the fitting of the surface profile is carried out by the use of a higher order multinomial expression, fitting error surely occurs. In particular, when there is a portion having a difference in level, the fitting results are varied around the portion of the difference in level and the error becomes larger, and thus the measuring accuracy is deteriorated. However, according to the configuration of the profile measuring device of the present invention, it is possible to measure the profile faithfully based on the design profile, and thus the measuring accuracy can be improved greatly.

BRIEF DESCRIPTION OF THE DRAWINGS

FIG. 1 is a view showing an optical path when light beams are focused onto an optical disk by using an objective lens for an optical disk according to a first embodiment of the present invention.

FIG. 4 is a graph showing an intensity distribution of a point image of the objective lens for the optical disk of Example 1 according to the first embodiment of the present invention.

FIG. 6 is a graph showing an intensity distribution of the point image of the objective lens for the optical disk of Example 2 according to the first embodiment of the present invention.

FIG. 8 is a graph showing an intensity distribution of the point image of the, objective lens for an optical disk of Example 3 of the first embodiment of the present invention.

FIG. 9 is a graph showing an aberration of the objective lens for an optical disk of Example 4 according to the first embodiment of the present invention.

FIG. 10 is a graph showing an intensity distribution of point image of the objective lens for an optical disk of Example 4 according to the first embodiment of the present invention.

FIG. 14 is a graph showing an intensity distribution of a point image of the objective lens for the optical disk of Example 5 according to the second embodiment of the present invention.

FIG. 15 is a view showing an optical path when light beams are focused onto an optical disk by using an objective lens for an optical disk according to a third embodiment of the present invention.

FIG. 16 is a view showing a configuration of a surface profile at the side of the optical disk of the objective lens for an optical disk according to the third embodiment of the present invention.

FIG. 18 is a graph showing an intensity distribution of a point image of the objective lens for the optical disk of Example 6 according to the third embodiment of the present invention.

FIG. 21 is a cross-sectional enlarged view in the direction of the radius, showing a portion (portion A) in the vicinity of a toric surface region 106 shown in FIG. 20.

FIG. 25 is a schematic view showing a working method for the mold according to a seventh embodiment of the present invention.

FIG. 27 is a view showing a configuration of an optical head device according to a ninth embodiment of the present invention.

FIG. 28 is a view showing an optical path when light beams are focused onto an optical disk by using an objective lens for an optical disk according to a prior art.

BEST MODE FOR CARRYING OUT THE INVENTION

Figure 2:
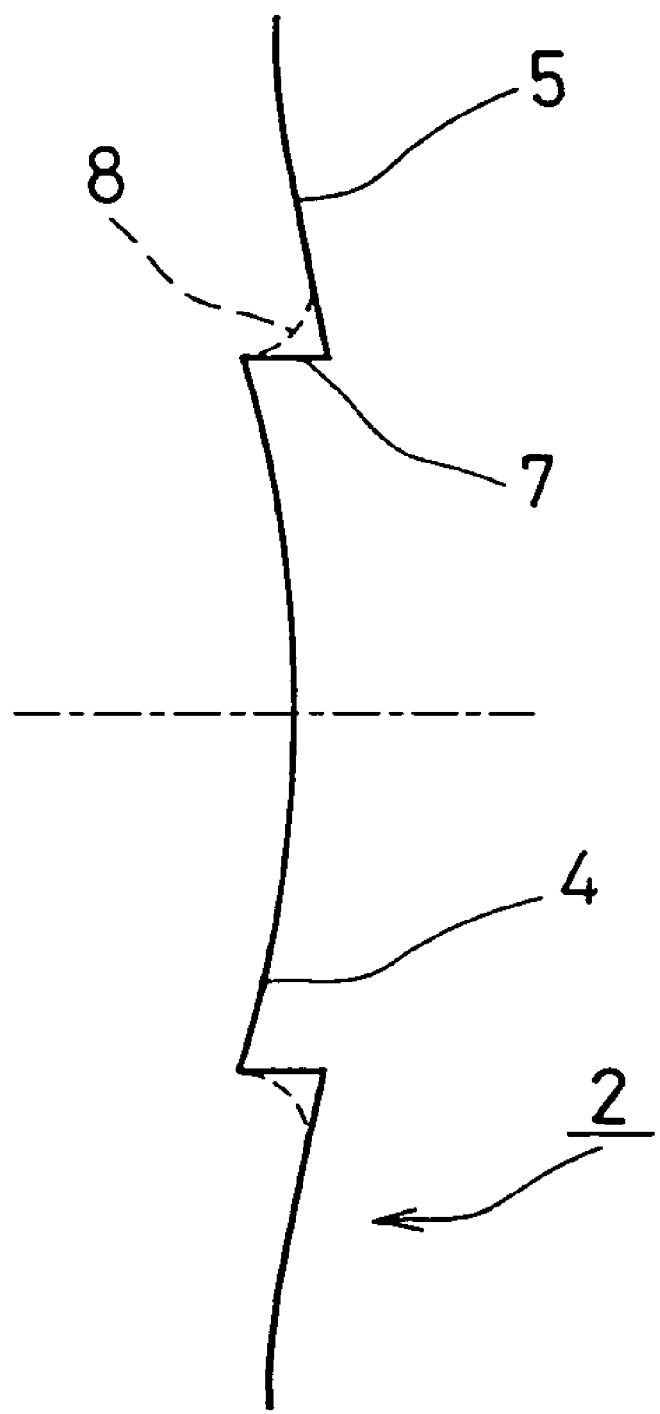
FIG. 2 is a view showing a configuration of a surface profile at the side of the optical disk of the objective lens for an optical disk according to the first embodiment of the present invention.

Hereinafter, the present invention will be described by way of the following embodiments.

[First Embodiment]

FIG. 1 is a view showing an optical path when light beams are focused onto an optical disk by using an objective lens for an optical disk according to a first embodiment of the present invention.

As shown in FIG. 1, the objective lens 2 of this embodiment includes a single lens having an aspheric surface on both sides. The surface 3 at the side of the light source of the objective lens 2 is a rotationally symmetric aspheric surface. Furthermore, the surface at the side of the optical disk 6 of the objective lens 2 includes an inner circumference region 4 and an outer circumference region 5. After incident light beams 1 enter the objective lens 2, they are focused onto an information medium surface 6a of the optical disk 6 via the objective lens 2.

As the optical disk 6 to be reproduced or recorded, a first optical disk made of a base material having a thickness of 0.6 mm and a second optical disk made of a base material having a thickness of 1.2 mm are prepared.

It is desirable that the wavefront aberration TW (unit: mλ: rms) satisfies the following relationship (2) when light beams are focused through the first optical disk substrate.

$$0.05 < TW < 0.12 \tag{2}$$

When TW is 0.05 or less, the aberration in a desired aperture becomes too bad at the time of reproducing the second optical disk, so that a sufficient focusing property cannot be obtained. On the other hand, when TW is 0.12 or more, the aberration at the first optical disk becomes too bad. Also in this case, a sufficient focusing property cannot be obtained.

Furthermore, it is desirable that NA1 satisfies the following relationship (3).

$$0.38 < NA1 < 0.46 \tag{3}$$

wherein NA1 denotes a NA of the objective lens 6 at the aperture of the inner circumference region 4.

When NA1 is 0.38 or less, the aperture becomes too small at the time of reproducing the second optical disk, so that the spot diameter becomes too large. On the other hand, when NA1 is 0.46 or more, unless the aberration at the first optical disk exceeds the upper limit of the relationship (2), it is impossible to satisfy the aberration at the second optical disk. As a result, the aberration at the first optical disk is deteriorated.

Furthermore, it is desirable that $p(n-1)/\lambda$ satisfies the following relationship (4).

$$0.1 < p(n-1)/\lambda < 0.6 \tag{4}$$

wherein n denotes a refractive index of the objective lens 2 at the wavelength of the light source when the first optical disk is reproduced, p denotes a difference in level in the direction of the optical axis between the inner circumference region 4 and the outer circumference region 5, and λ denotes a wave length of the light source when the first optical disk is reproduced.

When $p(n-1)/\lambda$ is 0.1 or less or 0.6 or more, the light focusing property, in particular the peak intensity of the Airy ring when the first optical disk is reproduced, is increased excessively, and thus, the reproducing characteristics of the optical disk 6 is deteriorated.

Furthermore, it is desirable that a fifth order spherical aberration component S5 (unit is λ: rms) satisfies the following relationship (5), when light beams are focused through the first optical disk substrate.

$$-0.03 < S5 < 0.03 \tag{5}$$

When S5 is −0.03 or less, or 0.03 or more, the focusing property, in particular the peak intensity of the Airy ring when the first optical disk is reproduced, is increased excessively, similar to the above-mentioned relationship (4). Thus, the reproducing characteristics of the optical disk 6 is deteriorated.

Furthermore, it is desirable that the thickness t3 of the optical disk 6 satisfies the following relationship (6), when the aspheric profile of the inner circumference region 4 is optimized so that the spherical aberration is corrected with respect to the thickness t3 of the optical disk 6.

$$0.8 < t3 < 1.2 \tag{6}$$

When t3 is 0.8 or less, the correction of the aberration with respect to the second optical disk is deficient. On the other hand, when t3 is 1.2 or more, the aberration with respect to the first optical disk is deteriorated.

FIG. 2 is a view showing a configuration of a surface profile at the side of the optical disk of the objective lens for an optical disk according to the first embodiment of the present invention. As shown in FIG. 2, on the surface at the side of the optical disk 6 (see FIG. 1) of the objective lens 2, surfaces 7 that form the difference in level are provided in parallel to the optical axis (in the direction of the optical axis) at the boundary between the inner circumference region 4 and the outer circumference region 5. Although the surfaces 7 forming the difference in level are emphasized as compared with the actual size in FIG. 2 for easy understanding, the actual difference in level is about 0.3 μm. Such a profile is ideal. However, for example, when the objective lens 2 is made by glass molding, the mold is made of a very hard material such as cemented carbide, and it is necessary to perform grinding work with a grindstone. Therefore, the portion having the difference in level between the inner circumference region 4 and the outer circumference region 5 becomes a circular arc profile as shown by reference numeral 8. However, the region in which the actual profile 8 is different from the ideal profile is at most 35 μm in the direction of the radius when, for example, the radius of the grindstone is 2 mm. This value is sufficiently small with respect to the whole effective diameter of the lens (about 4 mm), and thus the lens performance is hardly affected.

Next, the following are specific examples of numerical values of the objective lens 2 for an optical disk in this embodiment. In the below mentioned Examples, the remarks shown below are in common. Herein, a first surface of the objective lens 2 is a surface at the side of the light source, and a second surface is a surface at the side of the optical disk 6. Furthermore, the optical disk 6 is a parallel plate. Moreover, the wavelength of a first light source to be focused onto the first optical disk was set to be 655 nm, and the wavelength of the second light source to be focused onto the second optical disk was set to be 800 nm. Furthermore, the refractive index of the first optical disk at the first light source was set to be 1.578353, and the refractive index of the second optical disk at the second light source was set to be 1.57153.

f1: a focal distance of the objective lens at the first light source
WD1: a working distance of the objective lens with respect to the first optical disk
n1: a refractive index of the objective lens at the first light source
d: a lens thickness of the objective lens
t1: a thickness of the first optical disk substrate
t2: a thickness of the second optical disk substrate
t3: a thickness of the optical disk substrate when an aspheric profile of the inner circumference region is optimized so that the spherical aberration becomes 0
NA: NA of the objective lens
NA1: NA of the objective lens at the aperture of the inner circumference region
f2: a focal distance of the objective lens at the second light source
WD2: a working distance of the objective lens for the second optical disk
n2: a refractive index of the objective lens at the second light source
TW: wavefront aberration when light beams are focused onto the first optical disk from the first light source (unit is λ (wavelength): rms)
p: difference in level in the direction of the optical axis between the inner circumference region and the outer circumference region
S3: a third order spherical aberration component of the wavefront aberration when light beams are focused onto the first optical disk from the first light source (unit is λ (wavelength): rms)
S5: a fifth order spherical aberration component of the wavefront aberration when light beams are focused onto the first optical disk from the first light source (unit is λ (wavelength): rms)

Furthermore, the aspheric profile is expressed by the following relationship (21).

$$x = \frac{C_j h^2}{1 + \sqrt{1-(1+K_j)C_j^2 h^2}} + \sum A_{j,n} h^n \quad (21)$$

The remarks in the above-mentioned relationship (21) have the following denotations, respectively.
h: height from the optical axis
X: a distance between the point on the aspheric surface where the height from the optical axis is h and the tangential plane at the vertex of the aspheric surface
$C_j$: curvature at the vertex of the aspheric surface of a j-th surface of the objective lens ($C_j=1/R_j$)
$K_j$: a conic constant of the j-th surface of the objective lens
$A_{j,n}$: the n-th order aspheric coefficient of the j-th surface of the objective lens
wherein j is 1 or 2.

EXAMPLE 1

The following are specific numerical values of Example 1.
f1=3.3142
WD1=1.891
n1=1.602892
d=1.8
t1=0.6
t2=1.2
t3=1.1
NA=0.6
NA1=0.42
f2=3.3384
WD2=1.521
n2=1.59842

The following are the profile parameters of the first surface of the lens.
$R_1$=2.1700
$K_1$=−6.72993×10⁻¹
$A_{1,4}$=2.08530×10⁻³
$A_{1,6}$=7.99262×10⁻⁵
$A_{1,8}$=−7.79741×10⁻⁷
$A_{1,10}$=−7.00341×10⁻⁶

The following are the profile parameters at the inner circumference region of the second surface of the lens.
$R_2$=−17.3537
$K_2$=−3.61277×10
$A_{2,4}$=4.06605×10⁻³
$A_{2,6}$=−1.06794×10⁻³
$A_{2,8}$=9.75688×10⁻⁵
$A_{2,10}$=−2.01568×10⁻⁶

The following are the profile parameters at the outer circumference region of the second surface of the lens.

$R_2 = -16.46001$
$K_2 = -7.90807 \times 10$
$A_{2,4} = 4.57207 \times 10^{-3}$
$A_{2,6} = -1.35987 \times 10^{-3}$
$A_{2,8} = 1.72647 \times 10^{-4}$
$A_{2,10} = -8.80573 \times 10^{-6}$ The following are the other parameters of the lens.

TW=0.112
p=0.00059274
$p(n1-1)/\lambda=0.545$
S3=0.0125
S5=0.0231

Figure 3:
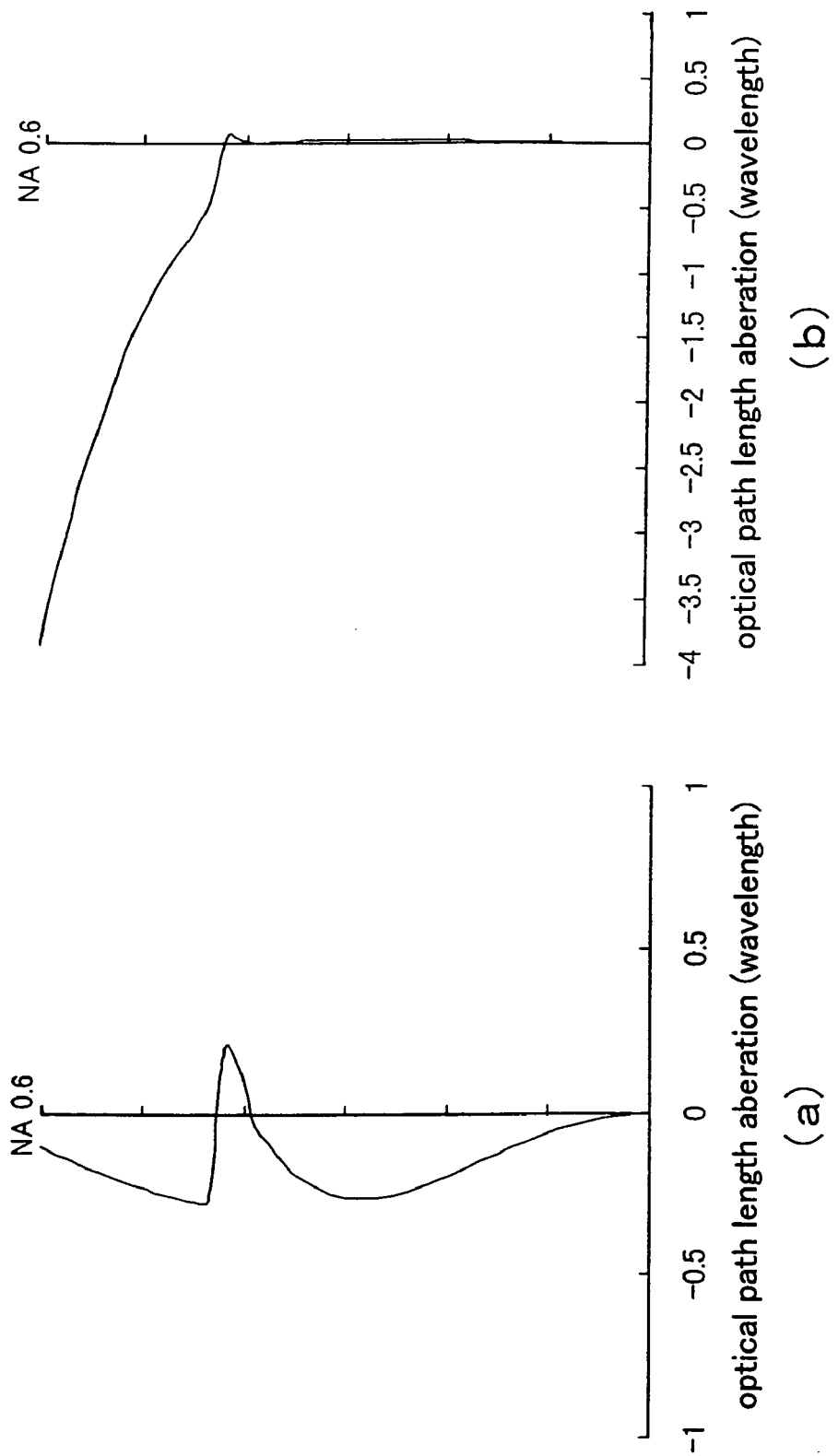
FIG. 3 is a graph showing an aberration in the objective lens for the optical disk of Example 1 according to the first embodiment of the present invention.

FIG. 3 is a graph showing aberrations according to this Example. FIG. 3(a) shows an optical path length aberration with respect to the first light source and the first optical disk, and FIG. 3(b) shows an optical path length aberration with respect to the second light source and the second optical disk. Furthermore, FIG. 4 is a graph showing a cross-sectional intensity distribution of a spot focused onto the first optical disk. Similarly, in the calculation of the cross-sectional intensity distribution of the other spots, it is assumed that the distribution of the quantity of incident light beams is uniform. A dashed line in FIG. 4 shows an ideal intensity distribution of a point image on the wavefront where the wavefront aberration is 0. Furthermore, the maximum peak of the calculated point image is normalized as 1. In FIG. 4, the intensity distribution of the point image around the Airy ring, which greatly affects the performance of the optical disk, is enlarged. The same is true in the below mentioned Examples 2 to 6.

The thickness of the first optical disk substrate is 0.6 mm. It is desirable that data of the first optical disk is reproduced by using the objective lens 2 having a NA of 0.6. As shown in FIG. 3(a), the optical path length aberration with respect to the first light source and the first optical disk is about ±0.25λ, and the wavefront aberration reaches 0.112λ: rms. However, as is apparent from FIG. 4 showing the cross-sectional intensity of the spot, there is hardly any difference in the profile of the spot from the profile of the ideal spot without aberration. Thus, it is possible to reproduce or record information without occurring any problems in performance of the optical disk 6.

Furthermore, it is desirable that data of the second optical disk is reproduced by using the objective lens 2 having a NA of about 0.45. However, as shown in FIG. 3(b), the optical path length aberration with respect to the second light source and the second optical disk is extremely small in the range wherein NA is not more than 0.42 and is rapidly increased in the range wherein NA is more than 0.42. When the light path length aberration is extremely large, the light beams reflected from the information medium surface of the optical disk 6 does not return to a photodetector. Consequently, the same effect is exhibited as if the objective lens 2 is provided with an aperture, and it is possible to reproduce or record information excellently without providing the objective lens 2 with a new aperture with respect to the optical disk 6 having a thickness of 1.2 mm.

EXAMPLE 2

The following are specific numerical values of Example 2.

f1=3.3142
WD1=1.890
n1=1.602892
d=1.8
t1=0.6
t2=1.2
t3=1.0
NA=0.6
NA1=0.42
f2=3.3384
WD2=1.540
n2=1.59842

The profile parameter of the first surface of the lens, and the profile parameters at the inner circumference region and the outer circumference region of the second surface of the lens are the same as in Example 1.

The following are the other parameters of the lens.

TW=0.0743
p=0.00030266
$p(n1-1)/\lambda=0.279$
S3=0.0025
S5=0.011

Figure 5:
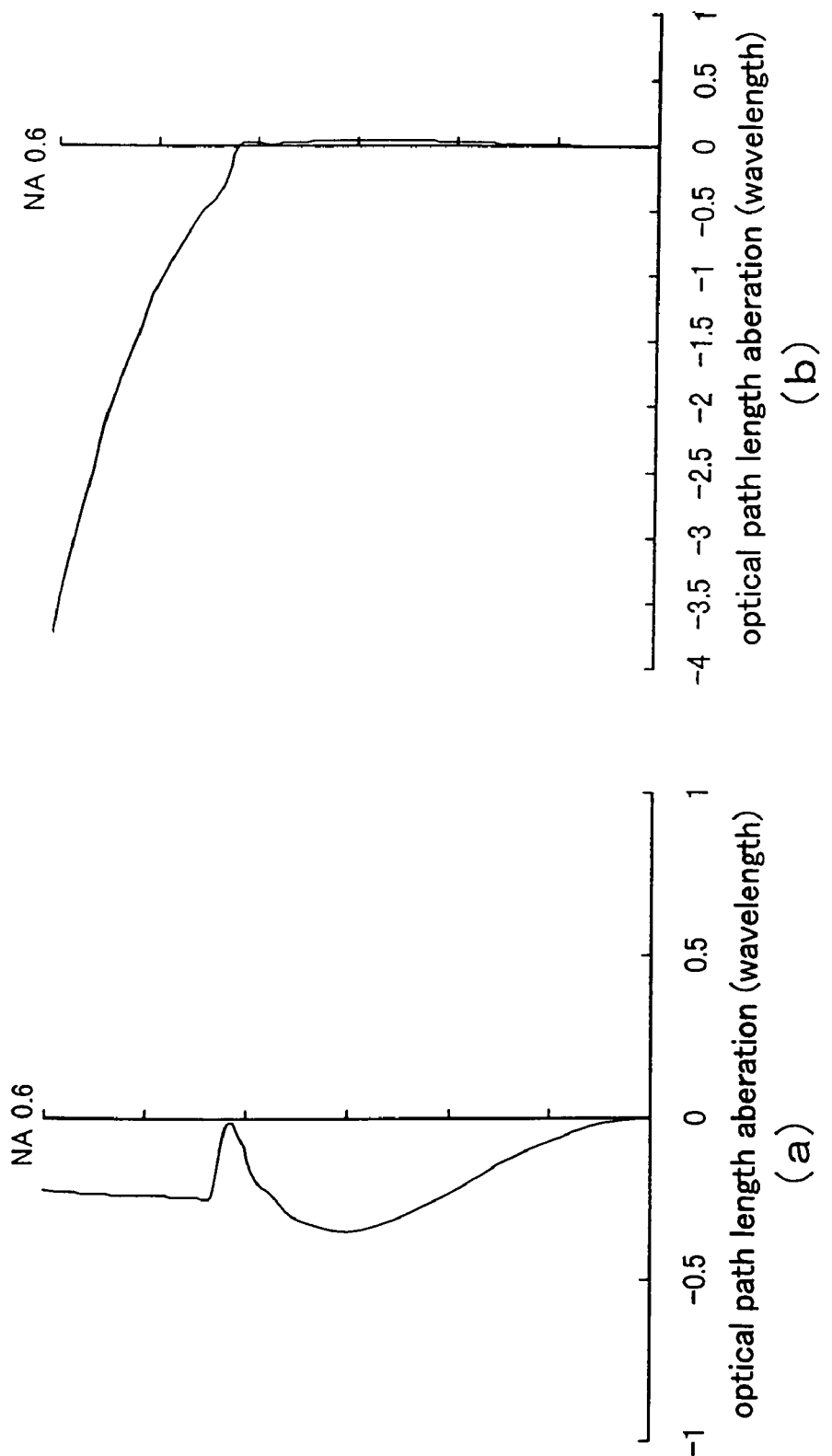
FIG. 5 is a graph showing an aberration of the objective lens for an optical disk of Example 2 according to the first embodiment of the present invention.

FIG. 5 is a graph showing aberrations according to this Example. FIG. 5(a) shows an optical path length aberration with respect to the first light source and the first optical disk, and FIG. 5(b) shows an optical path length aberration with respect to the second light source and the second optical disk. Furthermore, FIG. 6 is a graph showing a cross-sectional intensity distribution the spot focused onto the first optical disk.

The thickness of the first optical disk substrate is 0.6 mm. It is desirable that data of the first optical disk is reproduced by using the objective lens 2 having a NA of 0.6. As shown in FIG. 5(a), the optical path length aberration with respect to the first light source and the first optical disk is about −0.4 λ at maximum, and the wavefront aberration is 0.074 λ: rms. However, as is apparent from FIG. 6 showing the cross-sectional intensity distribution of the spot, there is hardly any difference in the profile of the spot from the profile of the ideal spot without aberration. Thus, it is possible to reproduce and record information without occurring any problems in performance of the optical disk 6.

Furthermore, it is desirable that data of the second optical disk is reproduced by using the objective lens 2 having a NA of about 0.45. However, as shown in FIG. 5(b), the optical path length aberration with respect to the second light source and the second optical disk is extremely small in the range wherein NA is not more than 0.42 and is rapidly increased in the range wherein NA is more than 0.42. Therefore, similarly to Example 1, the same effect is exhibited as if the objective lens 2 is provided with an aperture, and it is also possible to reproduce or record information excellently without providing the objective lens 2 with a new aperture with respect to the optical disk 6 having a thickness of 1.2 mm.

EXAMPLE 3

The following are specific numerical values of Example 3.

f1=3.3128
WD1=1.890
n1=1.602892
d=1.8
t1=0.6
t2=1.2
t3=1.0
NA=0.6
NA1=0.44
f2=3.3370

WD2=1.541
n2=1.59842

The following are the profile parameters of the first surface of the lens.

$R_1$=2.1700
$K_1$=6.72993×10⁻¹
$A_{1,4}$=2.0853×10⁻³
$A_{1,6}$=7.99262×10⁻⁵
$A_{1,8}$=−7.79741×10⁻⁷
$A_{1,10}$=−7.00341×10⁻⁶

The following are the profile parameters at the inner circumference region of the second surface of the lens.

$R_2$=−17.26266
$K_2$=−4.55689×10
$A_{2,4}$=4.13486×10⁻³
$A_{2,6}$=−1.11949×10⁻³
$A_{2,8}$=1.04423×10⁻⁴
$A_{2,10}$=−5.61508×10⁻⁷

The following are the profile parameters at the outer circumference region of the second surface of the lens.

$R_2$=−16.46001
$K_2$=−7.90807×10
$A_{2,4}$=4.57207×10⁻³
$A_{2,6}$=−1.35987×10⁻³
$A_{2,8}$=1.72647×10⁻⁴
$A_{2,10}$=−8.80573×10⁻⁶

The followings are the other parameters of the lens.

TW=0.072
p=0.00015135
p(n1−1)/λ=0.139
S3=0.0031
S5=−0.028

Figure 7:
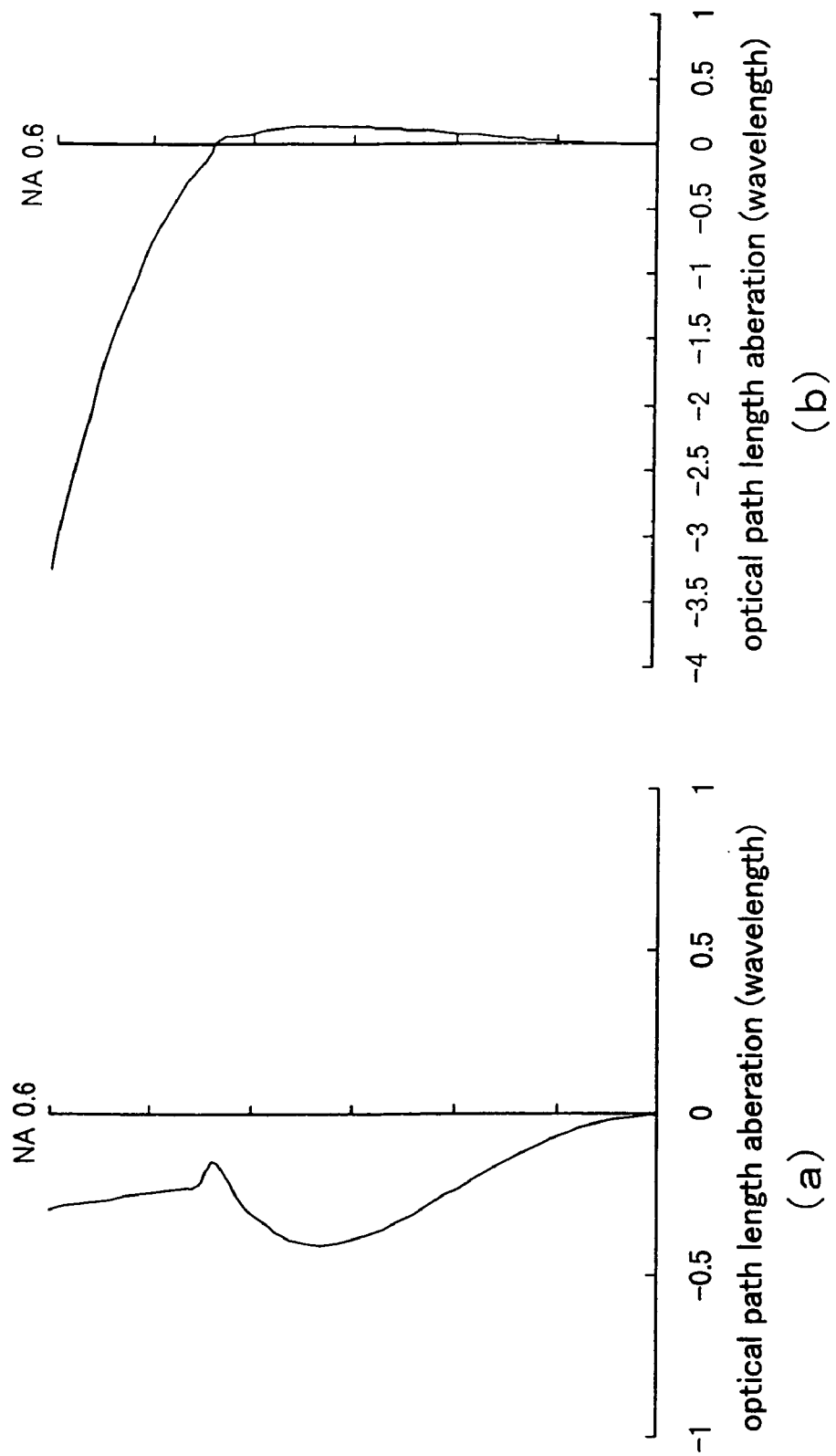
FIG. 7 is a graph showing an aberration of the objective lens for an optical disk of Example 3 according to the first embodiment of the present invention.

FIG. 7 is a graph showing aberrations of this Example. FIG. 7(a) shows an optical path length aberration with respect to the first light source and the first optical disk, and FIG. 7(b) shows an optical path length aberration with respect to the second light source and the second optical disk. Furthermore, FIG. 8 is a graph showing a cross-sectional intensity of the spot focused onto the first optical disk.

The thickness of the first optical disk substrate is 0.6 mm. It is desirable that data of the first optical disk is reproduced by using the objective lens 2 having a NA of 0.6. As shown in FIG. 7(a), the optical path length with respect to the first light source and the first optical disk is about −0.5 λ at maximum, and the wavefront aberration is 0.072 λ: rms. However, as is apparent from FIG. 8 showing the cross-sectional intensity distribution of the spot, there is hardly any difference in the profile of the spot from the profile of the ideal spot without aberration. Thus, it is possible to reproduce and record information without occurring any problems in performance of the optical disk 6.

Furthermore, it is desirable that data of the second optical disk is reproduced by using the objective lens 2 having a NA of about 0.45. However, as shown in FIG. 7(b), the optical path length aberration with respect to the second light source and the second optical disk is extremely small in the range wherein NA is not more than 0.44 and is rapidly increased in the range wherein NA is more than 0.44. Therefore, similarly to Example 1, the same effect is exhibited as if the objective lens 2 is provided with an aperture, and it is also possible to reproduce or record information excellently without providing the objective lens 2 with a new aperture with respect to the optical disk 6 having a thickness of 1.2 mm.

EXAMPLE 4

The following are specific numerical values of Example 4.

f1=3.3106
WD1=1.889
n1=1.602773
d=1.805
t1=0.6
t2=1.2
t3=0.9
NA=0.6
NA1=0.44
f2=3.3341
WD2=1.538
n2=1.59842

The following are the profile parameters of the first surface of the lens.

$R_1$=2.1700
$K_1$=−6.72993×10⁻¹
$A_{1,4}$=2.08530×10⁻³
$A_{1,6}$=7.99262×10⁻⁵
$A_{1,8}$=−7.79741×10⁻⁷
$A_{1,10}$=−7.00341×10⁻⁶

The following are the profile parameters at the inner circumference region of the second surface of the lens.

$R_2$=17.0574
$K_2$=−5.33838×10
$A_{2,4}$=4.25485×10⁻³
$A_{2,6}$=−1.18514×10⁻³
$A_{2,8}$=1.22997×10⁻⁴
$A_{2,10}$=−3.46201×10⁻⁶

The following are the profile parameters at the outer circumference region of the second surface of the lens.

$R_2$=−16.46575
$K_2$=0.0
$A_{2,4}$=6.72727×10⁻³
$A_{2,6}$=−1.61122×10⁻³
$A_{2,8}$=1.96560×10⁻⁴
$A_{2,10}$=−9.90970×10⁻⁶

The following are the other parameters of the lens.

TW=0.0589
p=0.00030266
p(n1−1)/λ=0.274
S3=0.0018
S5=−0.003

FIG. 9 is a graph showing aberrations of this Example. FIG. 9(a) shows an optical path length aberration with respect to the first light source and the first optical disk, and FIG. 9(b) shows an optical path length aberration with respect to the second light source and the second optical disk. Furthermore, FIG. 10 is a graph showing a cross-sectional intensity distribution of the spot focused onto the first optical disk.

The thickness of the first optical disk substrate is 0.6 mm. It is desirable that data of the first optical disk is reproduced by using the objective lens 2 having a NA of 0.6. As shown in FIG. 9(a), the optical path length aberration with respect to the first light source and the first optical disk is about −0.3 λ at maximum, and the wavefront aberration is 0.059 λ: rms. However, as is apparent from FIG. 10 showing the cross-sectional intensity distribution of the spot, there is hardly any difference in the profile of the spot from the profile of the ideal spot without aberration. Particularly, the peak intensity of the Airy ring is further lower than the ideal intensity distribution of the point image. Thus, it is possible to record and reproduce information without occurring any problems in performance of the optical disk 6.

Furthermore, it is desirable that data of the second optical disk is reproduced by using the objective lens 2 having a NA of about 0.45. However, as shown in FIG. 9(b), the optical path length aberration with respect to the second light source and the second optical disk is extremely small in the range wherein NA is not more than 0.44 and is rapidly increased in the range wherein NA is more than 0.44. Therefore, similarly to Example 1, the same effect is exhibited as if the objective lens 2 is provided with an aperture and it is also possible to reproduce or record information excellently without providing the objective lens 2 with a new aperture with respect to the optical disk 6 having a thickness of 1.2 mm.

[Second Embodiment]

Figure 11:
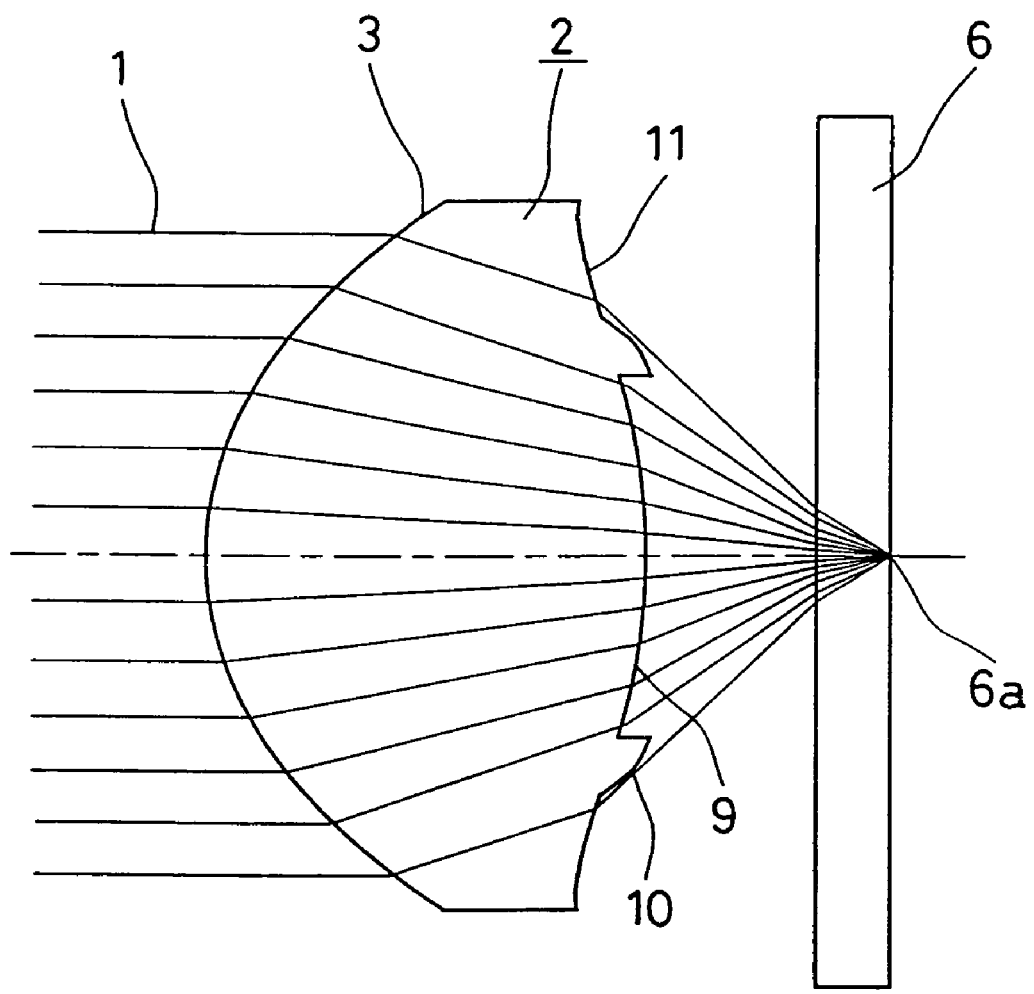
FIG. 11 is a view showing an optical path when light beams are focused onto an optical disk by using an objective lens for an optical disk according to a second embodiment of the present invention.

FIG. 11 is a view showing an optical path when light beams are focused onto an optical disk by the use of an objective lens for an optical disk according to the second embodiment of the present invention.

As shown in FIG. 11, the objective lens 2 according to this embodiment includes a single lens having aspheric surfaces on both sides. The surface 3 at the side of the light source of the objective lens 2 is a rotationally symmetric aspheric surface. Furthermore, the surface at the side of the optical disk 6 of the objective lens 2 includes an inner circumference region 9, a middle region 10 and an outer circumference region 11. After incident light beams enter the objective lens 2, they are focused onto an information medium 6a of the optical disk 6 by the objective lens 2.

Herein, it is desirable that NA2 and NA3 satisfy the following relationships (7) and (8):

$$0.35 < NA2 < 0.43 \quad (7)$$

$$0.03 < NA3 - NA2 < 0.1 \quad (8)$$

wherein NA2 denotes a NA of the objective lens 2 at the boundary between the inner circumference region 9 and the middle region 10, and NA3 denotes a NA of the objective lens 2 at the boundary between the middle region 10 and the outer circumference region 11.

When NA2 is 0.35 or less, or 0.43 or more, the desirable spot diameter with respect to the second optical disk cannot be obtained. Furthermore, when NA3−NA2 is 0.03 or less, the width of the middle region 10 becomes too narrow. Thus, it is difficult to correct the aberration with respect to the second optical disk. On the contrary, when NA3−NA2 is 0.1 or more, the width of the middle region 10 becomes too broad. Thus, the aberration with respect to the first optical disk is deteriorated.

Furthermore, it is desirable that t4 satisfy the following relationship (9) when the aspheric profile of the middle region 10 is optimized so that the spherical aberration is corrected with respect to the thickness t4 of the optical disk 6.

$$1.4 < t4 < 2.0 \quad (9)$$

When t4 is 1.4 or less, or 2.0 or more, the aberration with respect to the second optical disk is deteriorated.

Figure 12:
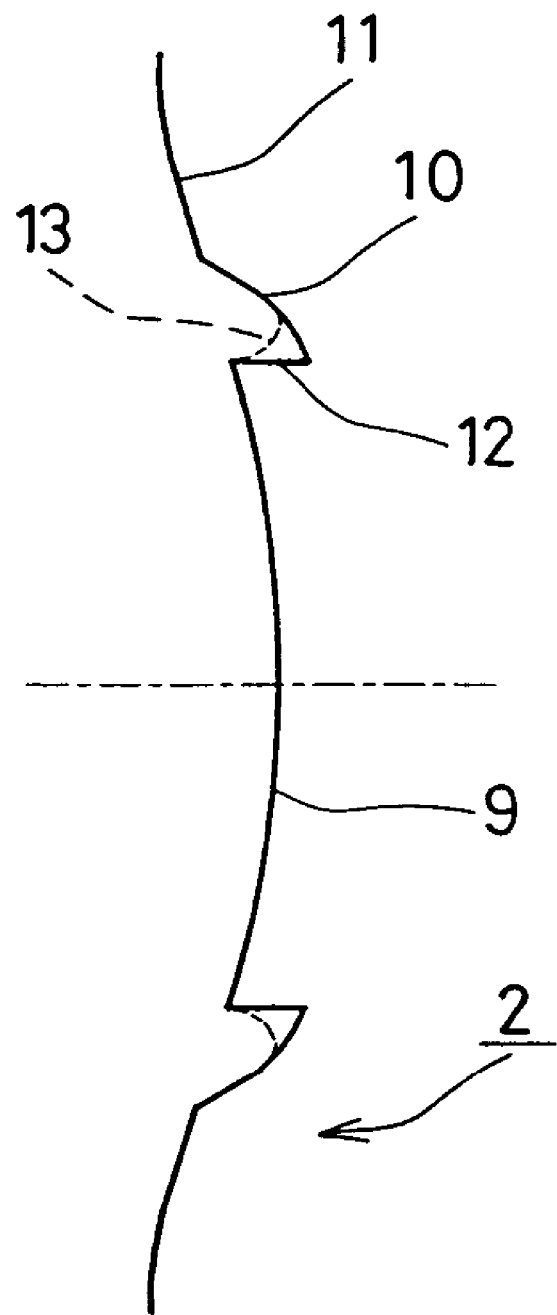
FIG. 12 is a view showing a configuration of a surface profile at the side of the optical disk of the objective lens for an optical disk according to the second embodiment of the present invention.

FIG. 12 is a view showing a configuration of a surface profile at the side of the optical disk of the objective lens according to the second embodiment of the present invention. As shown in FIG. 12, on the surface at the side of the optical disk 6 of the objective lens 2 (see FIG. 11), surfaces 12 forming the difference in level are provided approximately parallel to optical axis at the boundary between the inner circumference region 9 and the middle region 10. Although, the surfaces 12 forming the difference in level are emphasized as compared with the actual size in FIG. 12 for easy understanding, the actual difference in level is about 0.3 μm. Such a profile is ideal. However, for example, when grinding work is actually carried out by the use of a grindstone, the portion having the difference in level at the boundary between the inner circumference region 9 and the middle region 10 becomes a circular arc profile as shown by reference numeral 13. However, the region in which the actual profile 13 is different from the ideal profile is at most 35 μm in the direction of the radius when, for example, the radius of the grindstone is 2 mm. This value is sufficiently small with respect to the whole effective diameter of the lens (about 4 mm), and thus the lens performance is hardly affected. On the other hand, the profile of the middle region 10 is determined so that difference in level does not occur at the boundary between the middle region 10 and outer circumference region 11.

Next, the following are specific examples of numerical values of the objective lens 2 for an optical disk in this embodiment. Herein, besides the common remarks described in the first embodiment above, the below mentioned remarks are added.

NA2: NA of the objective lens at the boundary between the inner circumference region and the middle region.

NA3: NA of the objective lens at the boundary between the middle region and the outer circumference region t4: a thickness of the optical disk substrate when an aspheric profile of the middle region is optimized so that the spherical aberration becomes 0

EXAMPLE 5

The following are specific numerical values of Example 5.

f1=3.300
WD1=1.890
n1=1.602972
d=1.8
t1=0.6
t2=1.2
t4=1.8
NA2=0.39
NA3=0.44
f2=3.3241
WD2=1.538
n2=1.59842

The following are the profile parameters of the first surface of the lens.

$R_1 = 2.1700$
$K_1 = -6.72993 \times 10^{-1}$
$A_{1,4} = 2.0853 \times 10^{-3}$
$A_{1,6} = 7.99262 \times 10^{-5}$
$A_{1,8} = -7.79741 \times 10^{-7}$
$A_{1,10} = -7.0034 \times 10^{-6}$ The following are the profile parameters at the inner circumference region and outer circumference region of the second surface of the lens.

$R_2 = -16.46001$
$K_2 = -7.90807 \times 10$
$A_{2,4} = 4.57207 \times 10^{-3}$
$A_{2,6} = -1.35987 \times 10^{-3}$
$A_{2,8} = 1.72647 \times 10^{-4}$
$A_{2,10} = -8.80573 \times 10^{-6}$ The following are the profile parameters at the middle region of the second surface of the lens.

Figure 13:
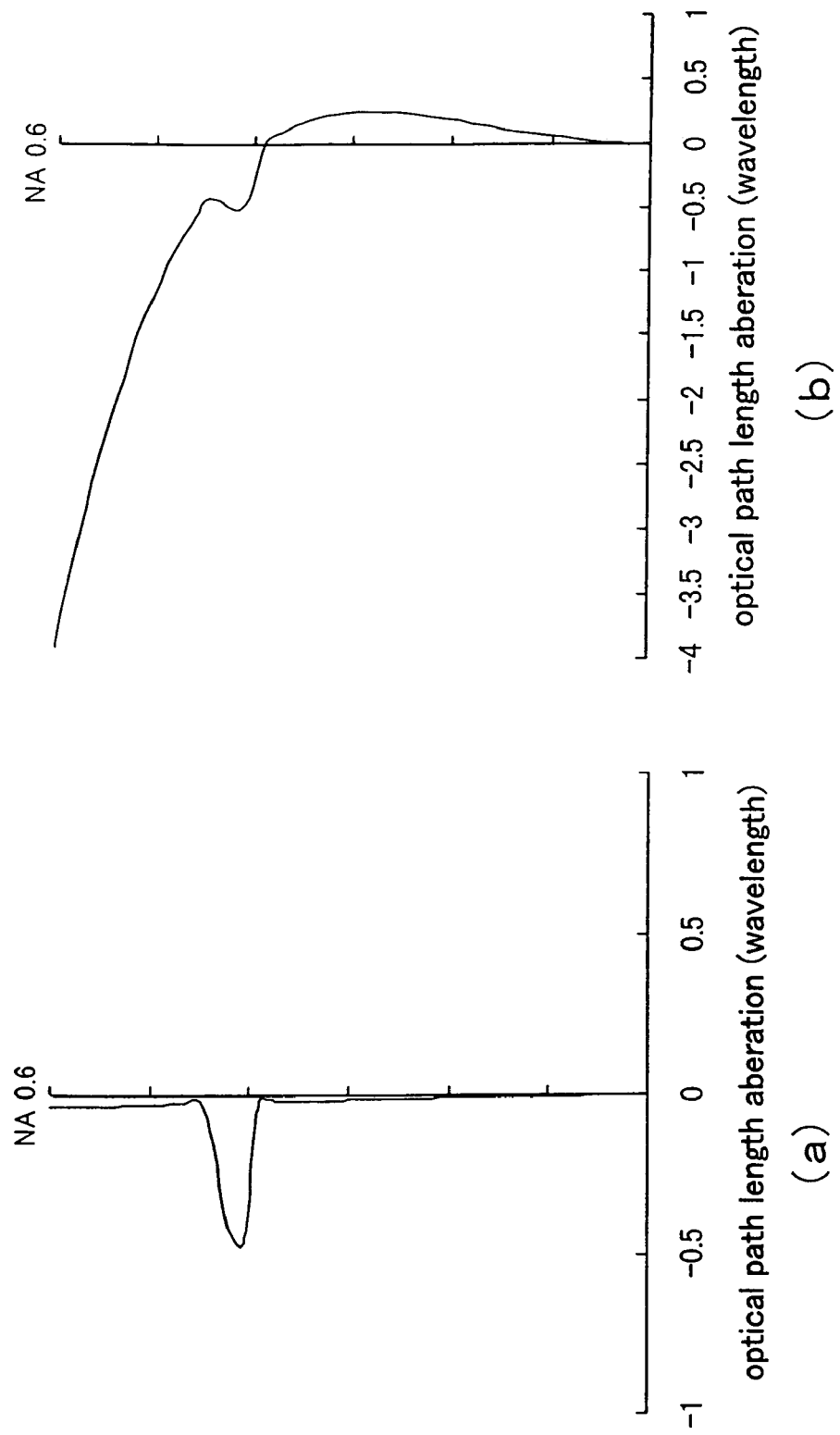
FIG. 13 is a graph showing an aberration in the objective lens for the optical disk of Example 5 according to the second embodiment of the present invention.

$R_2 = -18.9318$
$K_2 = 1.65803 \times 10$
$A_{2,4} = 2.81973 \times 10^{-3}$
$A_{2,6} = -4.83241 \times 10^{-4}$
$A_{2,8} = -3.23374 \times 10^{-5}$
$A_{2,10} = 1.75251 \times 10^{-5}$ FIG. 13 is a graph showing aberrations of this Example. FIG. 13(a) shows an optical path length aberration with respect to the first light source and the first optical disk, and FIG. 13(b) shows an optical path length aberration with respect to the second light source and the second optical disk. Furthermore, FIG. 14 is a graph showing a cross-sectional intensity distribution of the spot focused onto the first optical disk.

The thickness of the first optical disk substrate is 0.6 mm. It is desirable that data of the first optical disk is reproduced by using the objective lens 2 having a NA of 0.6. As shown in FIG. 13(a), the optical path length aberration with respect to the first light source and the first optical disk is about −0.5 λ at the NA of about 0.4. However, as is apparent from FIG. 14 showing the cross-sectional intensity distribution of the spot, there is hardly any difference in the profile of the spot from the profile of the ideal spot without aberration. Thus, it is possible to reproduce or record information without any problems in performance of the optical disk 6.

Furthermore, it is desirable that data of the second optical disk is reproduced by using the objective lens 2 having a NA of about 0.45. However, as shown in FIG. 13(b), the optical path length aberration with respect to the second light source and the second optical disk is small in the range wherein NA is not more than 0.44 and is rapidly increased in the range wherein NA is more than 0.44. When the optical path length aberration is extremely large, the light beams reflected from the information medium surface of the optical disk 6 does not return to the photodetector. Consequently, the same effect is exhibited as if the objective lens 2 is provided with an aperture, and it is also possible to reproduce or record information excellently without providing the objective lens 2 with a new aperture with respect to the optical disk 6 having a thickness of 1.2 mm.

[Third Embodiment]

FIG. 15 is a view showing an optical path when light beams are focused onto an optical disk by using an objective lens for an optical disk according to a third embodiment of the present invention.

As shown in FIG. 15, the objective lens 2 according to this embodiment includes a single lens having an aspheric surface on both sides. The surface 3 at the side of the light source of the objective lens 2 is a rotationally symmetric aspheric surface. Furthermore, the surface at the side of the optical disk 6 of the objective lens 2 includes an inner circumference region 14, a middle region 15 and an outer circumference region 16. After incident light beams 1 enter the objective lens 2, they are focused onto an information medium surface 6a of the optical disk 6 by the objective lens 2.

Herein, it is desirable that t5 satisfy the flowing relationship (10) when the aspheric profile of the middle region 15 is optimized so that the spherical aberration is corrected with respect to the thickness t5 of the optical disk 6.

$$1.0 < t5 < 1.4 \qquad (10)$$

When t5 is 1.0 or less, or 1.4 or more, the spherical aberration with respect to the second optical disk is deteriorated at the aperture at the inner side from the boundary between the inner circumference region 14 and the outer circumference region 16.

It is desirable that NA2 and NA3 satisfy the following relationship (12) and (13).

$$0.35 < NA2 < 0.43 \qquad (12)$$

$$0.03 < NA3 - NA2 < 0.1 \qquad (13)$$

wherein NA2 denotes a NA of the objective lens at the boundary between the inner circumference region 14 and the middle region 15, and NA3 denotes a NA of the objective lens at the boundary between the middle region 15 and the outer circumference region 16.

When NA2 is 0.35 or less, or 0.43 or more, the desirable spot diameter with respect to the second optical disk cannot be obtained. Furthermore, when NA3−NA2 is 0.03 or less, the width of the middle region 15 becomes too narrow, so that it is difficult to correct the aberration with respect to the second optical disk. On the contrary, when NA3−NA2 is 0.1 or more, the width of the middle region 15 becomes too broad, so that the aberration with respect to the first optical disk is deteriorated.

FIG. 16 is a view showing a configuration of a surface profile at the side of the optical disk of the objective lens according to the third embodiment of the present invention. As shown in FIG. 16, on the surface at the side of the optical disk of the objective lens 2 (see FIG. 15), the inner circumference region 14 is connected to the middle region 15 without difference in level at the boundary therebetween. Furthermore, the profile of the outer circumference region 16 is equal to the profile 17 in which optical path length is deviated by one wavelength with respect to the inner circumference region 14. Furthermore, the boundary between the middle region 15 and the outer circumference region 16 is determined so that the difference in level does not occur at the boundary between the middle region 15 and the outer region 16.

As mentioned above, in the objective lens 2 of this embodiment, since the difference in level is not provided between each region of the inner circumference region, the middle region and the outer circumference region, the working becomes easy.

EXAMPLE 6

The following are specific numerical values of Example 6.

f1=3.300
WD1=1.890
n1=1.602972
d=1.8
t1=0.6
t2=1.2
t4=1.2
NA2=0.39
NA3=0.46
f2=3.3241
WD2=1.539
n2=1.59842

The following are the profile parameters of the first surface of the lens.

$R_1 = 2.1700$
$K_1 = -6.72993 \times 10^{-1}$
$A_{1,4} = 2.08530 \times 10^{-3}$
$A_{1,6} = 7.99262 \times 10^{-5}$
$A_{1,8} = -7.79741 \times 10^{-7}$
$A_{1,10} = -7.00341 \times 10^{-6}$ The following are the profile parameters at the inner circumference region and outer circumference region of the second surface of the lens, wherein the intersection point between the profile of the outer circumference region and optical axis is shifted toward the first surface in parallel by 0.00109 as compared with the intersection point between the inner circumference region and the optical axis.

$R_2 = -16.46001$
$K_2 = -7.90807 \times 10$
$A_{2,4} = 4.57207 \times 10^{-3}$
$A_{2,6} = -1.35987 \times 10^{-3}$
$A_{2,8} = 1.72647 \times 10^{-4}$
$A_{2,10} = -8.80573 \times 10^{-6}$ The following are the profile parameters at the middle region of the second surface of the lens, wherein the intersection point between the profile of the middle region and optical axis is shifted toward the first surface in parallel by 0.0003419 as compared with the intersection point between the inner circumference region and the optical axis.

Figure 17:
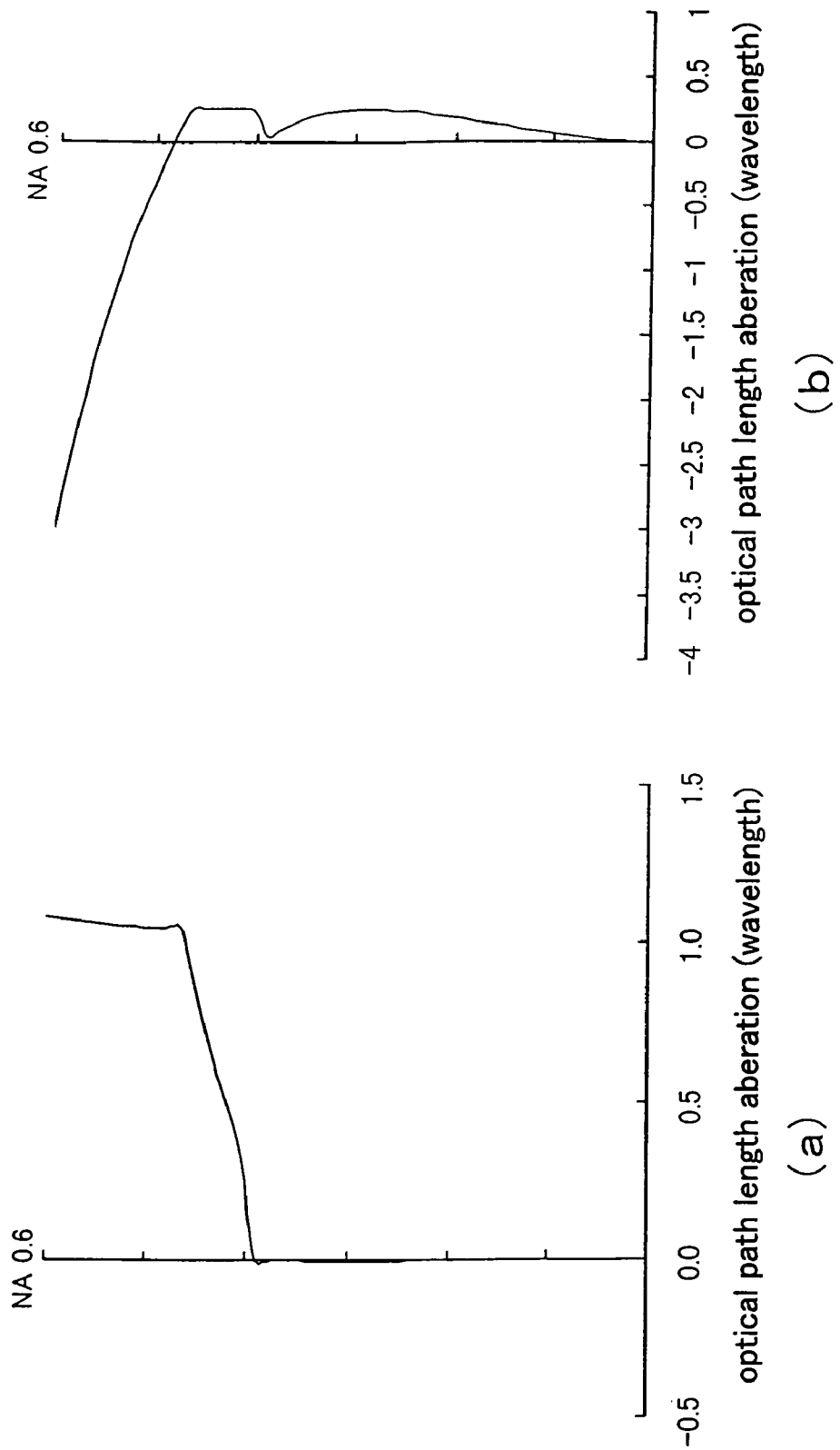
FIG. 17 is a graph showing an aberration in the objective lens for the optical disk of Example 6 according to the third embodiment of the present invention.

$R_2 = -17.3870$
$K_2 = -2.71760 \times 10$
$A_{2,4} = 3.98819 \times 10^{-3}$
$A_{2,6} = -9.93390 \times 10^{-4}$
$A_{2,8} = 6.64032 \times 10^{31}$
$A_{2,10} = 6.11772 \times 10^{-6}$ FIG. 17 is a graph showing aberrations of this Example. FIG. 17(a) shows an optical path length aberration with respect to the first light source and the first optical disk. FIG. 17(b) shows an optical path length aberration with respect to the second light source and the second optical disk. Furthermore, FIG. 18 is a graph showing a cross-sectional intensity distribution of the spot focused onto the first optical disk. As shown in FIG. 17(a), the optical path length aberration with respect to the first light source and the first optical disk is shifted by one wavelength when NA is 0.46 or more. As is apparent from FIG. 18 showing the cross-sectional intensity distribution of the spot, there is hardly any difference in the profile of the spot from the profile of the ideal spot without aberration. Thus, it is possible to reproduce or record information without occurring any problems in performance of the optical disk 6.

Furthermore, it is desirable that data of the second optical disk is reproduced by using the objective lens 2 having a NA of about 0.45. However, as shown in FIG. 17(b), the optical path length aberration with respect to the second light source and the second optical disk is small in the range wherein NA is not more than 0.46 and is rapidly increased in the range wherein NA is more than 0.46. When the optical path length aberration is extremely large, the light beams reflected from the information medium surface of the optical disk 6 does not return to the photodetector. Consequently, the same effect is exhibited as if the objective lens 2 is provided with an aperture, and it is possible to reproduce or record information excellently without providing the objective lens 2 with a new aperture with respect to the optical disk 6 having a thickness of 1.2 mm.

Furthermore, the profile of the middle region 15 is designed so that the focal position at which a wavefront aberration of the inner circumference region 14 is minimized and the focal position at which a wavelength aberration of the middle region 15 is minimized are the same when light beams are focused onto the second optical disk. Therefore, when the light beams reflected from the information medium surface of the optical disk 6 enter the photodetector, light beams return to the same portions with respect to the inner circumference region 14 and the middle region 15. As a result, the accurate signal light can be obtained.

Furthermore, in this Example, since the third order spherical aberration component of the wavefront aberration in the inner circumference region 14 and the middle region 15 is as small as 0.0019λ, it is possible to reproduce and record information of the second optical disk excellently.

It is desirable that the objective lens 2 shown in Examples 1 to 6 is formed by glass molding or plastic molding. This is because by working a mold of the aspheric profile, lenses having the same profile and the same performance can be mass-produced at low cost.

[Fourth Embodiment]

Figure 19:
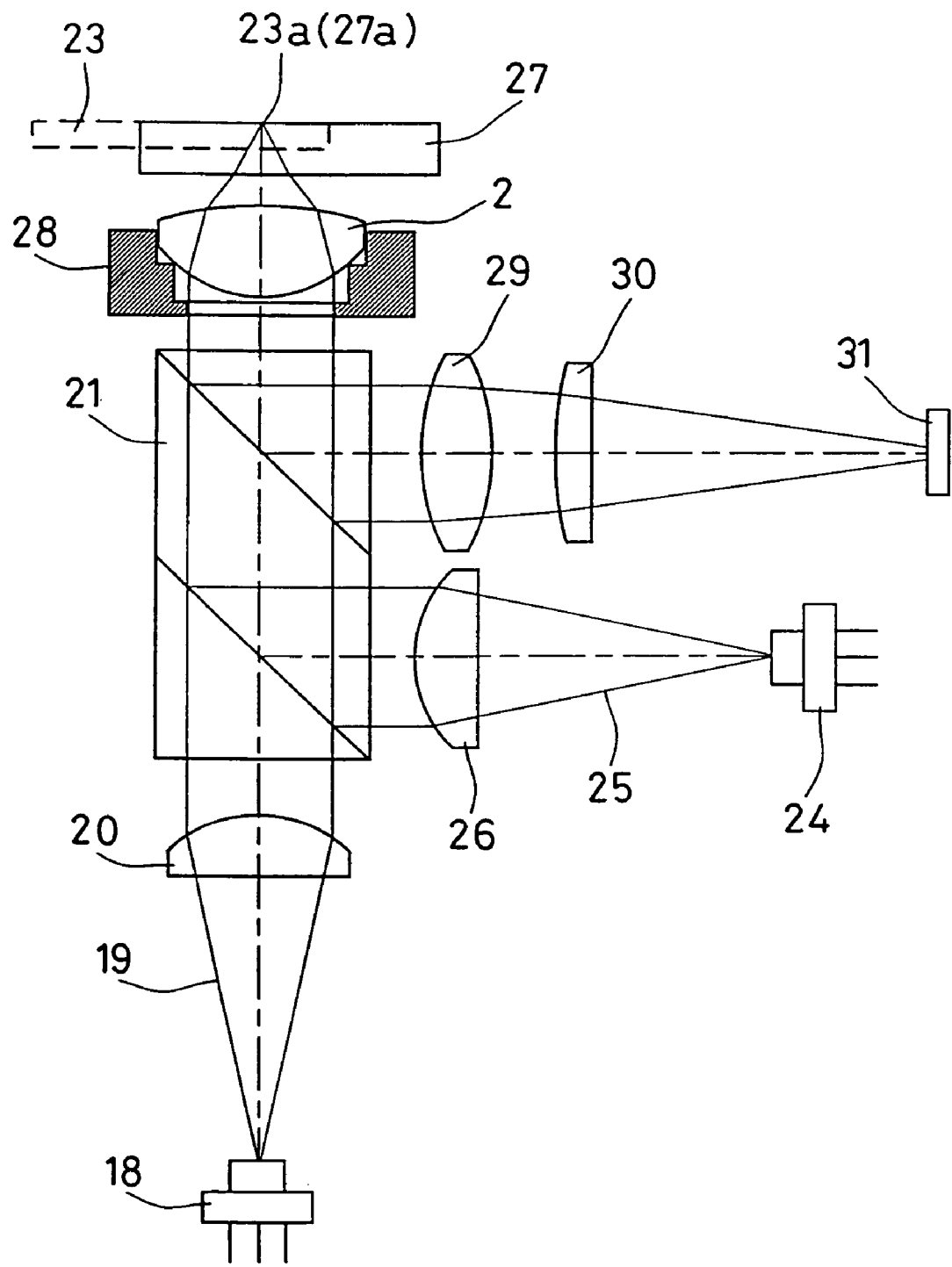
FIG. 19 is a view showing a configuration of an optical head device and optical information recording and reproducing apparatus according to the fourth embodiment of the present invention.

Next, an optical head device and an optical information recording and reproducing apparatus using the objective lens for an optical disk according to one of the first to third embodiments will be described with reference to FIG. 19. FIG. 19 is a view showing a configuration of an optical head device and an optical information recording and reproducing apparatus according to the fourth embodiment of the present invention.

As shown in FIG. 19, a light flux 19 emitted from a semiconductor laser 18 having a wavelength of 655 nm (that is the first light source) is made to be approximately parallel light by a collimate lens 20. The light flux 19 that has been made to be approximately parallel light by the collimate lens 20 passes through a beam splitter 21 and is focused onto the information medium surface 23a of the first optical disk 23 having a thickness of 0.6 mm by the optical lens 2 shown in any one of the first to third embodiments. Furthermore, a light flux 25 emitted from a semiconductor laser 24 having a wavelength of 800 nm (that is a second light source) is made to be approximately parallel light by a collimate lens 26. The light flux 25 that has been made to be approximately parallel light by the collimate lens 26 is reflected from the beam splitter 21 and is focused onto the information medium surface 27a of the second optical disk 27 having a thickness of 1.2 mm by the same objective lens 2. Herein, the objective lens 2 is attached to a movable holder 28, which allows the focal point of the objective lens 2 to be matched to the information medium surface in accordance with blurring of the surface of the optical disk and serves as limiting the aperture of the objective lens 2. The light focusing spot is diffracted by a roughness part formed on the information medium surface 23a of the first optical disk 23 or on the information medium surface 27a of the second optical disk 27. The laser beams (light flux 19 or 25) diffracted and reflected by the information medium surface 23a of the first optical disk 23 or the information medium 27a of the second optical disk 27 is reflected from the beam splitter 21 and refracted by a convex lens 29 and a cylindrical lens 30 and focused onto the photodetector 31. Then, the quantity of light modulated at the information medium surface 23a of the first optical disk 23 or the information medium surface 27a of the second optical disk 27 is detected by an electric signal of the photodetector 31, and the data is read out.

As mentioned above, when light beams are focused onto the first optical disk 23 having a substrate thickness of 0.6 mm by the use of the first light source having a wavelength of 655 nm, although the objective lens 2 has a large wavefront aberration value itself, the intensity of the Airy ring of the focused spot in relatively low. The intensity of the Airy ring affects the recording and reproducing of the first optical disk 23. Therefore, excellent recording and reproducing characteristics can be obtained.

As mentioned above, when light beams are focused onto the second optical disk 27 having a substrate thickness of 1.2 mm by the use of the second light source having a wavelength of 800 nm, the aperture of the lens holder 28 still corresponds to NA of 0.6, when NA of the objective lens 2 is 0.4 or 0.45 or more, the optical path length aberration is rapidly increased. Thus, the same effect is exhibited as in a state in which the aperture is provided at the objective lens 2. Furthermore, at the light receiving side, when NA is 0.4 or 0.45 or more, light beams are present outside the photodetector 31 because the optical path length aberration is large. Consequently, the same effect in which the objective lens 2 is masked (provided with an aperture) is exhibited. Needless to say, when NA is 0.4 or 0.45 or less, the optical path length aberration is sufficiently corrected with respect to the second light source. Therefore, it is possible to obtain excellent recording and reproducing characteristics with respect to the second optical disk 27 having a thickness of 1.2 mm.

As mentioned above, by providing the objective lens 2 with the aberration suitable to the respective optical disk, it is possible to carry out excellent recording and reproducing with respect to two different optical disks with the use of one lens.

In the above-mentioned embodiments, the wavelength of the light source is set to be 655 nm and 800 nm. However, other wavelengths, for example, the combination of 400 nm and 650 nm etc. may be employed.

Furthermore, in the above-mentioned embodiments, the substrate thickness of the two kinds of optical disks are set to be 0.6 mm and 1.2 mm. However, other thicknesses, for example, the combination of 0.3 mm and 0.6 mm etc. may be employed.

Furthermore, in the above-mentioned embodiments, the refractive index of the objective lens 2 is set to be about 1.6. However, a material having a refractive index from 1.45 to 2.0 etc. may be used as long as the material is glass material or plastic material.

Furthermore, in the above-mentioned embodiments, NA for the first optical disk is set to be 0.6. However, NA of 0.6 or more and NA of 0.6 or less may be employed.

Furthermore, in the above-mentioned embodiments, the difference in level etc. is formed on the surface at the side of the optical disk (the second surface) of the objective lens 2. However, the difference in level etc. may be provided on the surface at the side of the light source (a first surface) of the objective lens 2. Furthermore, the function shown in the above mentioned embodiments may be added to an optical element, such as a parallel plate, etc. other than the conventional single lens.

Furthermore, in the above-mentioned embodiments, the aperture limitation is not varied in accordance with the substrate thickness of the optical disk with respect to the objective lens 2. However, aperture limitation may be added in accordance with the different substrate thickness.

Furthermore, in the above-mentioned embodiments, the case where approximately parallel light beams are incident into the objective lens 2 is described. However, light beams emitted from the semiconductor laser may be focused directly by one lens. Furthermore, instead of making approximately parallel light beams by a collimate lens, a lens having an finite magnifying power for making divergent light beams or convergent light beams may be used.

[Fifth Embodiment]

In the present invention, aspheric surface refers to a profile in which the spherical surface having a paraxial radius of curvature as a radius is provided with the deviation. In other words, aspheric surface is a profile that can be expressed by the following equation (22). Moreover, the lens profile capable of being expressed by the following equation (22) with the necessary and sufficient accuracy in optical design (profile error of less than 10 nm) may be designed by the use of the different equation.

$$z = \frac{(1/r)^2 h^2}{1 + \sqrt{1 - (1+k)(1/r)^2 h^2}} + \sum_j A_j h^j \quad (22)$$

Figure 20:
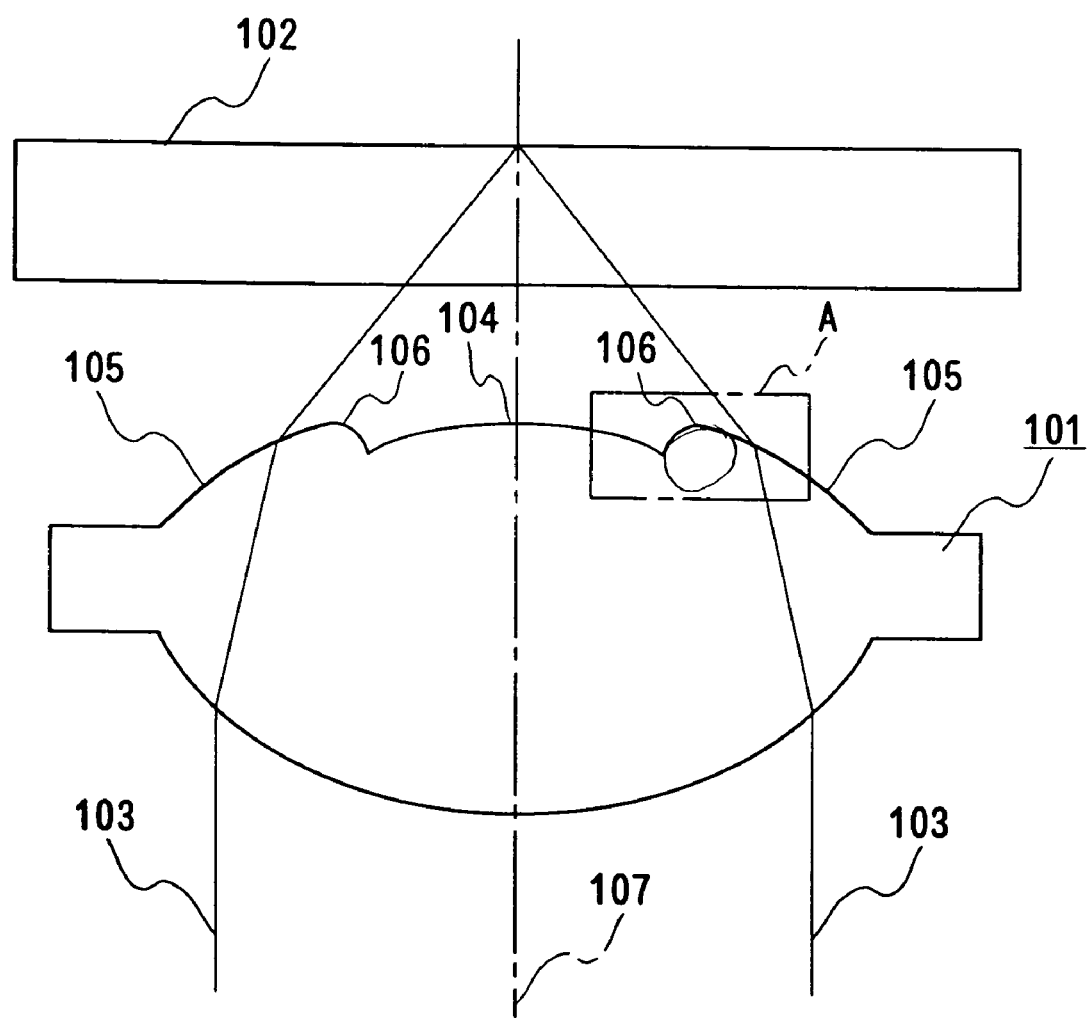
FIG. 20 is a view showing an optical path when light beams are focused onto an optical disk by using an objective lens for an optical disk according to a fifth embodiment of the present invention.

The following are denotations of the variables used in the above-mentioned equation (22).

z: sag
h: height from the optical axis
r: radius of curvature
k: a conic constant
$A_j$: the j-th order aspheric coefficient FIG. 20 is a view showing an optical path when light beams are focused onto an optical disk by using an objective lens for an optical disk according to a fifth embodiment of the present invention.

As shown in FIG. 20, an objective lens 101 of this embodiment includes a single lens. Furthermore, the surface at the side of the optical disk 102 of the objective lens 101 includes a first aspheric surface region 104 at the inner circumference portion including the optical axis 107, a second aspheric surface region 105 at the outer circumference portion, and a toric surface region 106 sandwiched by the first aspheric surface region 104 and the second aspheric surface region 105 and having an optical axis 107 as a rotationally symmetric central axis. Incident light 103 from the light source is incident on the objective lens 101, and then focused onto the optical disk 102 by the objective lens 101.

The first and second aspheric surface regions 104 and 105 of the objective lens 101 are designed so that data on CD and DVD disks can be reproduced excellently with one lens. Specifically, the first aspheric surface region 104 including an optical axis 107 is designed so that it can excellently reproduce data on a CD by the use of a light source emitting light beams having a wavelength of 780 nm, and the second aspheric surface region 105 is designed so that it can excellently reproduce data on a DVD by the use of a light source emitting light beams having a wavelength of 660 nm. By connecting these first and second aspheric surface regions 104 and 105 with each other with a discontinuous portion having a difference in level mentioned below, it is possible to reproduce excellently data on a CD or DVD disks by the use of a light source having the respective wavelength over the entire region of the lens.

In FIG. 20, the surface having a large central radius of curvature is divided into three regions with the toric surface region 106 as a boundary. This is effective in enhancing the degree of freedom in selecting the diameter of the grindstone for working a mold. This will be described in detail in the next embodiment.

FIG. 21 is a cross-sectional enlarged view in the direction of radius showing a portion (portion A) in the vicinity of a toric surface region 106 shown in FIG. 20.

As shown in FIG. 21, the toric surface region 106 is a toric surface obtained by rotating a circular arc having a radius R with an optical axis 107 (see FIG. 20) as a center. This toric surface region 106 is formed so that it is in contact with the second aspheric surface region 105 of the outer circumference portion and intersects the first aspheric surface region 104 of the inner circumference portion. Herein, that the toric surface region 106 "is in contact with" the second aspheric surface region 105 means that tilts of tangential at the connecting point of the surface curve of the toric surface region 106 and the surface curve of the second aspheric surface region 105 coincide with each other at the radial cross section. Furthermore, that the toric surface region 106 "intersects" the first aspheric surface region 104 means that tilts of the tangential lines at the connecting point of the surface curve of the toric surface region 106 and the surface curve of the first aspheric surface region 104 do not coincide with each other, and intersect at the predetermined angle.

Final design profile is shown by solid line in FIG. 21.

It is desirable that the width of the toric surface region 106 in the direction of the radius (width of the circular arc) w satisfies the following relationship (16).

$$0.02 \text{ mm} < w < 0.04 \text{ mm} \quad (16)$$

As shown in FIG. 21, the width w is defined as the difference between the height of the connecting point between the first aspheric surface region 104 and toric surface region 106 from the optical axis 107 and the height of the connecting point between the second aspheric surface region 105 and the toric surface region 106 from the optical axis 107. When w is 0.02 mm or less, the profile cannot be worked by a grindstone, thus making it difficult to produce the lens. On the other hand, when w is 0.04 mm or more, the difference between the actual lens profile and the ideal design profile is too large, and thus the lens performance is not sufficient.

Furthermore, it is desirable that the radius R of the circular arc forming the toric surface region 106 satisfies the following relationship (14).

$$0.7 \text{ mm} < R < 2.5 \text{ mm} \quad (14)$$

When R is 0.7 mm or less, a mold cannot be worked by grinding, thus making it difficult to produce the lens. On the other hand, when R is 2.5 mm or more, the width of the circular arc portion is too broad, thus deteriorating the lens performance.

Furthermore, it is desirable that the radius R of the circular arc forming the toric surface region 106 satisfies the following relationship (15).

$$1.6 \text{ mm} < R < 2.1 \text{ mm} \quad (15)$$

EXAMPLE 7

Figure 22:
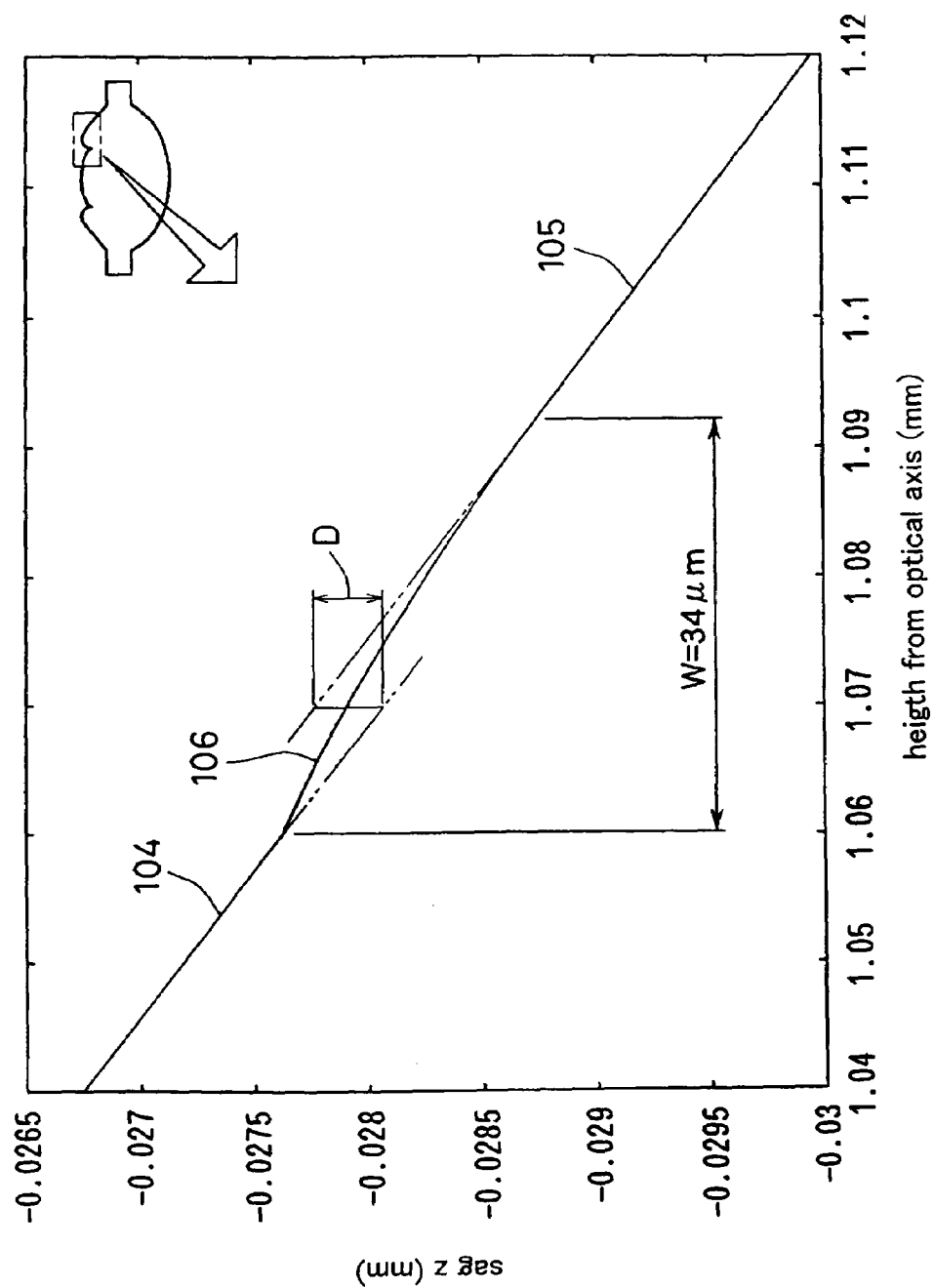
FIG. 22 is a cross-sectional enlarged view in the direction of the radius, showing a portion in the vicinity of a toric surface region of one example of the objective lens obtained by actually calculating the lens profile according to the fifth embodiment of the present invention.

FIG. 22 is a cross-sectional enlarged view in the direction of the radius, showing a portion in the vicinity of a toric surface region of one example of the objective lens obtained by actually calculating the lens profile according to the present invention. In FIG. 22, a horizontal axis shows a height h (mm) from the optical axis 107, and a vertical axis shows a sag amount z with the intersection of the first aspheric surface region 104 and the optical axis 107 as an origin.

The following Table 1 shows aspheric data at the first aspheric surface region 104 of the inner circumference portion.

TABLE 1

$r = -1.682 \times 10$
$k = -7.90807 \times 10$
$A_3 = 2.605947654 \times 10^{-3}$
$A_4 = 1.054073967 \times 10^{-4}$
$A_6 = 6.605216379 \times 10^{-4}$
$A_8 = -4.966151680 \times 10^{-4}$
$A_{10} = 8.362178008 \times 10^{-5}$ The following Table 2 shows aspheric data at the second aspheric surface region 105 of the inner circumference portion.

TABLE 2

$r = -1.682 \times 10$
$k = -4.10782 \times 10$
$A_3 = -2.083119392 \times 10^{-3}$
$A_4 = 7.583760761 \times 10^{-3}$
$A_6 = -2.145398325 \times 10^{-2}$
$A_8 = 3.23346325 \times 10^{-4}$
$A_{10} = -2.125916694 \times 10^{-5}$ In FIG. 22, when an aspheric surface curve of the first aspheric surface region 104 and an aspheric surface curve of the second aspheric surface region 105 are extended, respectively, toward each other as shown by the dashed lines, distance D in the direction of the optical axis of both curves at the point where the height h from the optical axis 107 is 1.07 mm is 0.303 μm. In the present invention, such a distance in the direction of the optical axis at the connecting portion of the first aspheric surface region and the second aspheric surface region is called "a difference in level at the connecting portion." Furthermore, connecting of the first aspheric surface region and aspheric surface region in the direction of the optical axis with the predetermined direction (i.e., a difference in level) is referred to as "connecting with a difference in level." The radius R of the circular arc forming the toric surface region 106 is 2 mm, a coordinate of the central point of the circular arc is (h, z)=(1.006469, −2.026898). Furthermore, the width w of the toric surface region 106 connecting the aspheric surface regions 104 and 105 of the inner and outer circumferences is about 34 μm.

Figure 23:
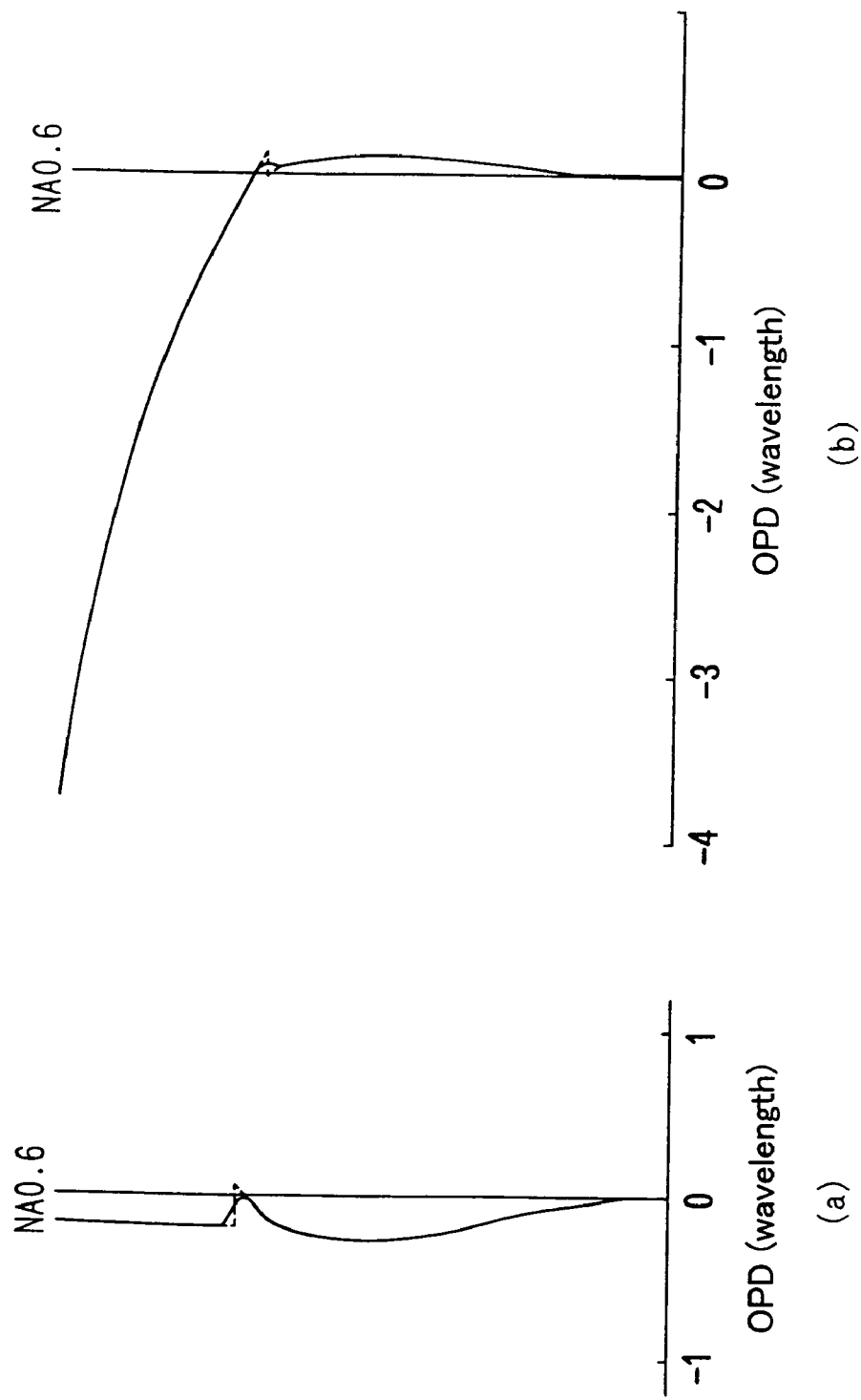
FIG. 23 are graphs showing an aberration when data of DVD and CD are reproduced by using the objective lens according to the fifth embodiment of the present invention.

FIG. 23 shows aberration curves (optical path length difference curve: OPD) when data on a DVD and CD are reproduced. FIG. 23(a) shows an aberration curve when data on a DVD is reproduced, and FIG. 23(b) shows an aberration curve when data on a CD is reproduced.

Herein a curve shown by a broken line shows an aberration curve under the ideal condition in which aspheric surface regions 104 and 105 of the inner and outer circumferences are not connected by the toric surface region 106 as in this embodiment, but connected with the difference in level as shown by the dashed lines of FIG. 22. In the objective lens of this embodiment shown by the solid line of FIG. 22, as compared with the objective lens under the ideal condition, the aberration curve is deformed in the toric surface region 106, however, this does not affect the reproduction on DVD and CD disks.

[Sixth Embodiment]

Figure 24:
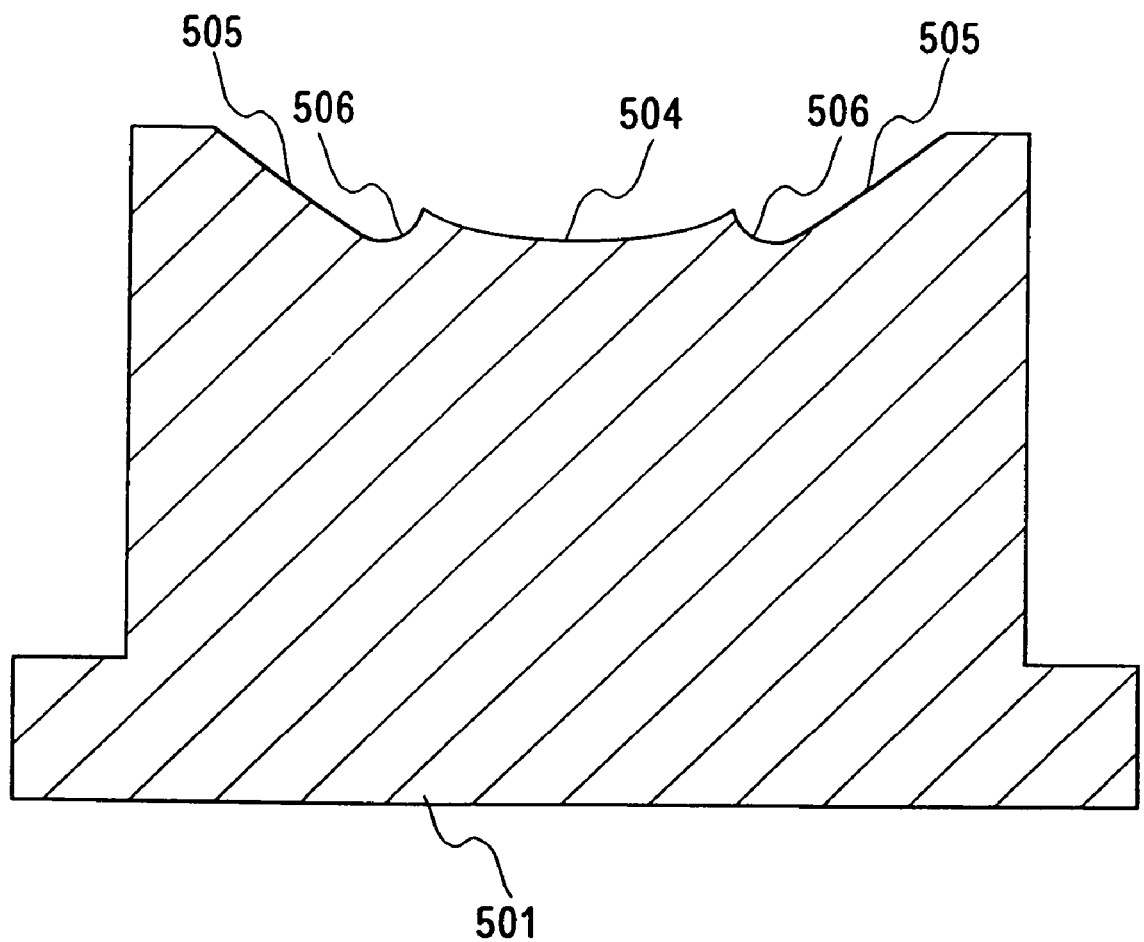
FIG. 24 is a cross-sectional view in the direction of the radius, showing a mold for molding lens according to a sixth embodiment of the present invention.

FIG. 24 is a cross-sectional view in the direction of radius showing a mold for molding a lens according to a sixth embodiment of the present invention. As shown in FIG. 24, a lens surface of the mold 501 of this embodiment is divided into three regions by concentric circles having a rotationally symmetric central axis as a center. Specifically, the molding surface of the mold 501 of this embodiment is divided into a first aspheric surface region 504 including a rotationally symmetric central axis, a third aspheric surface region 505 located at an outermost part and a toric surface region 506 having a rotationally symmetric central axis as a center of rotation and sandwiched between the first aspheric region 504 and the third aspheric surface region 505. It is desirable that the radius of curvature R of the toric surface region 506 at a cross-section in the direction of the radius satisfies the following relationship (17).

$$0.7 \text{ mm} < R < 2.5 \text{ mm} \quad (17)$$

It is further desirable that the radius of curvature R of the toric surface region 506 at a cross-section in the direction of the radius satisfies the following relationship (18).

$$1.6 \text{ mm} < R < 2.1 \text{ mm} \quad (18)$$

If a grindstone having a radius that is the same as or smaller than the above-mentioned radius of curvature R is used, a grinding work is possible. Therefore, a cemented carbide (for example, a sintered metal including WC as a main component) capable of molding a high melting temperature glass material under high pressure can be used as a material for the mold 501.

The profile of the worked mold 501 is measured by a profile measuring device. When a stylus type measuring device is used, the tip profile of the stylus (probe) is required to have a radius of curvature smaller than the minimum radius of curvature of the profile to be measured. Namely, when the profile to be measured has a curve profile smaller than the tip diameter of the probe, the part of the measurement result is deviated, and consequently it is impossible to measure accurately. Using a probe having a small diameter is one solution to prevent this. However, the roundness of the small diameter probe is not so good. In particular, the measuring accuracy at the inclined face is deteriorated. With the mold 501 having a toric surface region 506 with a radius of curvature R being in the above-mentioned range, it is possible to accurately measure the profile by the use of the probe having a tip radius of curvature of about 500 μm.

Furthermore, when an optical measuring device is used, as compared with the case where the aspheric surface regions 104 and 105 of the inner and outer circumferences are connected with the difference in level as shown by the dashed lines in FIG. 22, the change in the profile of the toric surface region 506 is sufficiently smooth in the wavelength order, so that the wave face of the measured light is connected continuously. Therefore, also in this case, precise measurement is possible.

[Seventh Embodiment]

As a material for a mold for molding glass material, a high hardness material (cemented carbide) excellent in heat resistance so that it is not deformed even if it is pressed at a temperature higher than the melting point of glass is used. Working of cemented carbide is carried out by grinding work with the use of the diamond grindstone.

FIG. 25 is a schematic view showing a working method for the mold according to a seventh embodiment of the present invention. FIG. 25(a) is a front elevational view and FIG. 25(b) is a side elevational view.

As shown in FIG. 25, a mold 601 to be worked is rotated about a rotation axis 602 of the mold 601. A grindstone 603 is rotated about a rotation axis of the grindstone 603. The grindstone 603 moves along a curve 605 that is offset from the profile of the worked surface by the radius R of the grindstone 603 so as to work the surface of the mold into the lens profile 606.

By setting the radius R of the grindstone 603 to be the same as or smaller than the radius of curvature of the toric surface region to be worked, it is possible to work the mold described in the sixth embodiment. When the radius R of the grindstone 603 is 80% or more, preferably 90% or more, more preferably 95% or more, of the radius of curvature of the toric surface region to be worked, it is possible to work the mold efficiently.

As is apparent from FIG. 25(b), the diameter of the axle 607 (an axle diameter) of the grindstone 603 is limited by the sag of the lens to be worked, diameter R of the grindstone 603, and a clearance between the mold 601 to be worked and the axle 607 of the grindstone 603. When the radius R of the grindstone 603 is small or the sag of the lens to be worked is large, it is necessary to make the axle 607 of the grindstone 603 thin. When the axle 607 of the grindstone 603 is made thin, a bending, etc. occurs, which may lead the deterioration of working accuracy. In order to secure a sufficient axle diameter, it is necessary to carry out a working of the difference in level on the surface having a small amount of sag and to increase the radius R of the grindstone 603 sufficiently as compared with the sag of the lens.

In order to work a mold for molding a zone divided type lens excellently, it is desirable that the radius R of the grindstone 603 satisfies the following relationship (19):

$$0.7 \text{ mm} < R < 2.5 \text{ mm} \quad (19)$$

When R is 0.7 mm or less, since the axle diameter of the grindstone 603 is too thin, the accuracy of the worked surface becomes bad. On the other hand, when R is 2.5 mm or more, the toric surface region (connecting region) is broadened, and the aberration of the molded lens is deviated greatly from the design value. Furthermore, it is further desirable that the radius R of the grindstone 603 satisfies the following relationship (20).

$$1.6 \text{ mm} < R < 2.1 \text{ mm} \quad (20)$$

When the radius R of the grindstone 603 is within this range, it is possible to reduce the width of the toric surface region and at the same time to maintain the axle diameter of the grindstone 603 so as to have a sufficient strength excellently.

[Eighth Embodiment]

Figure 26:
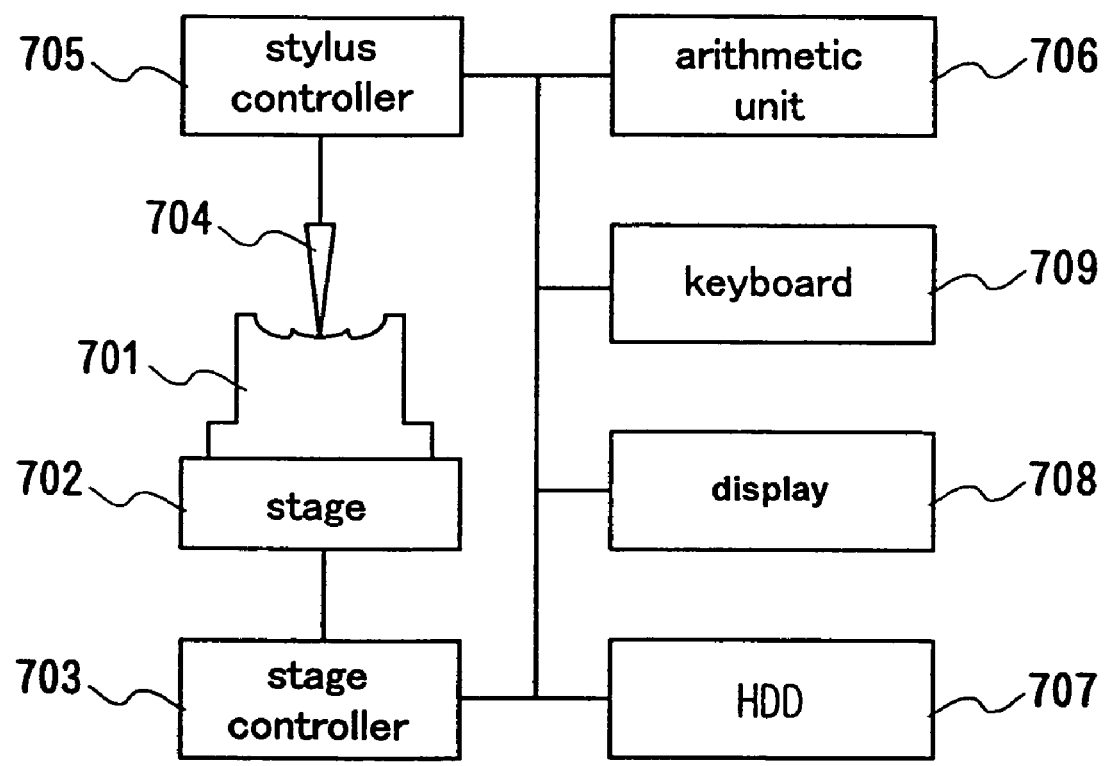
FIG. 26 is a view showing a configuration of a profile measuring device according to an eighth embodiment of the present invention.

FIG. 26 is a view showing a configuration of a profile measuring device according to an eighth embodiment of the present invention.

As shown in FIG. 26, a test mold 701 is placed on a stage 702. The stage 702 is movable in the horizontal direction by a stage controller 703. A stylus 704 is controlled/maintained by a stylus controller 705 so that it is movable in a vertical direction while being in contact with the surface of the test mold 701.

The stage controller 703 and the stylus controller 705 transmit the horizontal coordinate Y of the stage 702 and its corresponding vertical coordinate Z of the stylus 704 to an arithmetic unit 706. Coordinate data rows consisting of Y and Z serves as the profile data (measuring data) information of the test mold 701. Design profile data of the test mold 701 is stored in a hard disk drive (HDD) 707. The arithmetic unit 706 displays a working error obtained by comparing the measurement data with design profile data on a display 708. Furthermore, a keyboard 709 is used for a data input or an operation of the profile measuring device.

In the profile measuring device of the present invention, it is possible to use the rotationally symmetric aspheric surfaces of the inner and outer circumferences and its connecting surface, that is, a toric surface having a light axis as a axis of rotation as the design profile data. Therefore, it is possible to measure the profile of the worked lens profile without error.

Specifically, in a case where the mold profile for a single lens described in the fifth embodiment, the height $h_1$ from the optical axis of the boundary portion between a first aspheric surface region of the inner circumference portion and a toric surface region is 1.06, and the height $h_2$ from the optical axis the boundary portion between a second aspheric region of the outer circumference portion and a toric surface region is 1.094. Therefore, the profile is expressed by using the coefficients shown in Table 1 into the above-mentioned equation (22) in the range of 0<h<1.06, and by using the coefficients shown in Table 2 into the below-mentioned equation (23) in the range of 1.094<h.

$$z = \frac{(1/r)^2 h^2}{1 + \sqrt{1-(1+k)(1/r)^2 h^2}} + A_0 + \sum_j A_j h^j \qquad (23)$$

In the above-mentioned equation (23), $A_0$ is a coefficient for running the second aspheric surface region of the outer circumference portion in parallel in the direction of the z-axis so that the difference in level becomes appropriate. In this case, this coefficient becomes 0.303. Furthermore, in the range of 1.06<h<1.094, the profile is expressed by an equation of a circular arc having a center coordinate (h, z)=(1.006469, −2.026898) and a radius of 2 mm. At this time, the profile of the circular arc is expressed by the following equation (24).

$$z = z_0 + \sqrt{R^2 - (h-h_0)^2} \qquad (24)$$

wherein $h_0$=1.006469 and $z_0$−2.026898.

In this embodiment, the case where the stylus type profile measuring device is used is described. However, the profile measuring device is not necessarily limited to this type of device. Even if an optical non-contact type profile measuring device or a measuring device using interatomic force is used, the same effect can be obtained.

[Ninth Embodiment]

FIG. 27 is a view showing a configuration of an optical head device according to a ninth embodiment of the present invention.

In FIG. 27, numerals 801 and 802 denote laser modules for DVD and CD devices, respectively. The laser module 801 for the DVD device includes a semiconductor laser for emitting laser beams having a wavelength of 660 nm and a photodetector for receiving reflected light beams from a disk (DVD 806). Similarly, the laser module 802 for the CD device includes a semiconductor laser for emitting laser beams having a wavelength of 780 nm and a photodetector for receiving reflected light beams from a disk (CD 807).

When the data on the DVD is reproduced, a light flux emitted from the laser module 801 for the DVD device passes through a beam splitter 803, is converted into an approximately parallel light flux by a collimate lens 804 and then enters an objective lens 805 of the present invention. The objective lens 805 of the present invention forms a focused spot on the information recording surface of a DVD 806. The reflected light beams from DVD 806 are converted into parallel light beams by the objective lens 805, and converted into convergent light beams by the collimate lens 804. The convergent light beam passes through the beam splitter 803, and is then focused onto the photodetector of the laser module 801 for the DVD device.

Next, the operation when data on the CD is reproduced will be described. The light beams from the laser module 802 for the CD device are reflected from the beam splitter 803, and then converted into an approximately parallel light flux by the collimate lens 804, and then enters the objective lens 805 of the present invention. The objective lens 805 of the present invention forms a focused spot on the information recording surface of CD 807. The reflected light beams from the CD 807 are converted into an approximately parallel light flux by the collimate lens 804, then reflected from the beam splitter 803, and focused onto the photodetector of the laser module 802 for the CD device.

Herein, since a single glass lens of the present invention is used as the objective lens 805, the fluctuation of the aberration of the objective lens 805 due to changes in temperature is sufficiently small. Therefore, when it is necessary to secure the operation over a wide temperature range, for example, as a vehicle apparatus, etc. an excellent performance can be exhibited.

In the above-mentioned fifth to ninth embodiments, as the objective lens having a DVD/CD compatibility, the single lens divided into two zones including the inner aspheric surface region and the outer aspheric surface region is described. However, even if the design in which a three-zone divided type single lens is used, by connecting the difference in level portion of each zone on the toric surface having an optical axis as a rotationally symmetric axis, the same effect can be obtained.

INDUSTRIAL APPLICABILITY

As mentioned above, according to the present invention, it is possible to attain an objective lens for an optical disk that is capable of focusing a point image through the first and second optical disk substrates each having a different thickness. The objective lens is applicable for an optical head device that reads data on CD or CD-ROM disks having a disk thickness of 1.2 mm and data on DVD or DVD-ROM disks having a disk thickness of 0.6 mm using one optical head.

The invention claimed is:

1. An objective lens for an optical disk comprising a single lens focusing light beams into a point image through first and second optical disk substrates each having a different thickness,
    at least one surface of the objective lens being divided into
        at least three regions by concentric circles having an optical axis as a center, the three regions including:
        a first region, including the optical axis, that is a rotationally symmetric aspheric surface;
        a second region that is a rotationally symmetric aspheric surface; and
        a third region, sandwiched by the first region and the second region, that is a toric surface having the optical axis as an axis of rotation and is in contact with the second region and intersects the first region,
    wherein, the light beam incident on the third region substantially does not form the point image through the first and second optical disk substrates,
    wherein, when the first region and the second region are extended respectively toward each other, an extended portion of the first region and an extended portion of the second region have a distance between each other in a direction of the optical axis, at a position having the same height from the optical axis, corresponding to the third region.

2. The objective lens for an optical disk according to claim 1, wherein aspheric coefficients of the first region and the second region are different from each other.

3. The objective lens for an optical disk according to claim 1, wherein the toric surface is provided on the surface having a larger central radius of curvature of the lens.

* * * * *